United States Patent
Chiba et al.

(10) Patent No.: US 7,042,344 B2
(45) Date of Patent: May 9, 2006

(54) ALARMING SYSTEM FOR VEHICLE AND ALARM GENERATING METHOD FOR VEHICLE

(75) Inventors: Hisashi Chiba, Kanagawa (JP); Tohru Okada, Kanagawa (JP); Masashi Gotoh, Kanagawa (JP); Kazutomo Itoh, Kanagawa (JP)

(73) Assignee: Suzuki Motor Corporation, Shizuoka (JP)

( * ) Notice: Subject to any disclaimer, the term of this patent is extended or adjusted under 35 U.S.C. 154(b) by 198 days.

(21) Appl. No.: 10/834,160

(22) Filed: Apr. 29, 2004

(65) Prior Publication Data

US 2004/0239490 A1    Dec. 2, 2004

(30) Foreign Application Priority Data

May 30, 2003    (JP)    ............... 2003-155140

(51) Int. Cl.
*B60Q 1/00*    (2006.01)
(52) U.S. Cl. ............... 340/435; 340/436; 340/540; 340/541; 340/686.6; 340/691.1; 340/904; 340/903; 701/96; 701/301
(58) Field of Classification Search .......... 340/435, 340/540, 541, 436, 691.1, 686.6, 903, 904; 701/96, 301
See application file for complete search history.

(56) References Cited

U.S. PATENT DOCUMENTS 4,937,795 A    6/1990   Motegi et al.
5,684,473 A *  11/1997  Hibino et al. ............ 340/903
6,853,311 B1 *  2/2005  Taniguchi ................ 340/903
2004/0090314 A1  5/2004  Iwamoto

FOREIGN PATENT DOCUMENTS

| JP | 5-266400   | 10/1993 |
| JP | 7-291064   | 11/1995 |
| JP | 2000-339595 | 12/2000 |

OTHER PUBLICATIONS

English Language Abstract of JP 7-291064.
English Language Abstract of JP 2000-339595.
English Language Abstract of JP 5-266400.

* cited by examiner

*Primary Examiner*—Tai T. Nguyen

(74) *Attorney, Agent, or Firm*—Greenblum & Bernstein, P.L.C.

(57) ABSTRACT

An obstacle detecting means for detecting data related to the position of an obstacle existing on the side of a vehicle or in front thereof, a computer for computing the detected data, and an alarming means are mounted in the vehicle. The computer includes: a function of setting an alarming area having a certain distance from the side part of the vehicle and a forwardly extended line of the side part, in an outward direction lateral to the side part; a function of tracking the obstacle based on the obstacle data; a function of calculating a traveling locus of the obstacle relative to the vehicle and predicting the traveling locus thereafter; a function of determining whether the traveling locus enters into the alarming area; and a function of generating an alarm to the occupants by the alarming means when the traveling locus is determined to enter into the alarming area.

13 Claims, 16 Drawing Sheets

FIG. 5
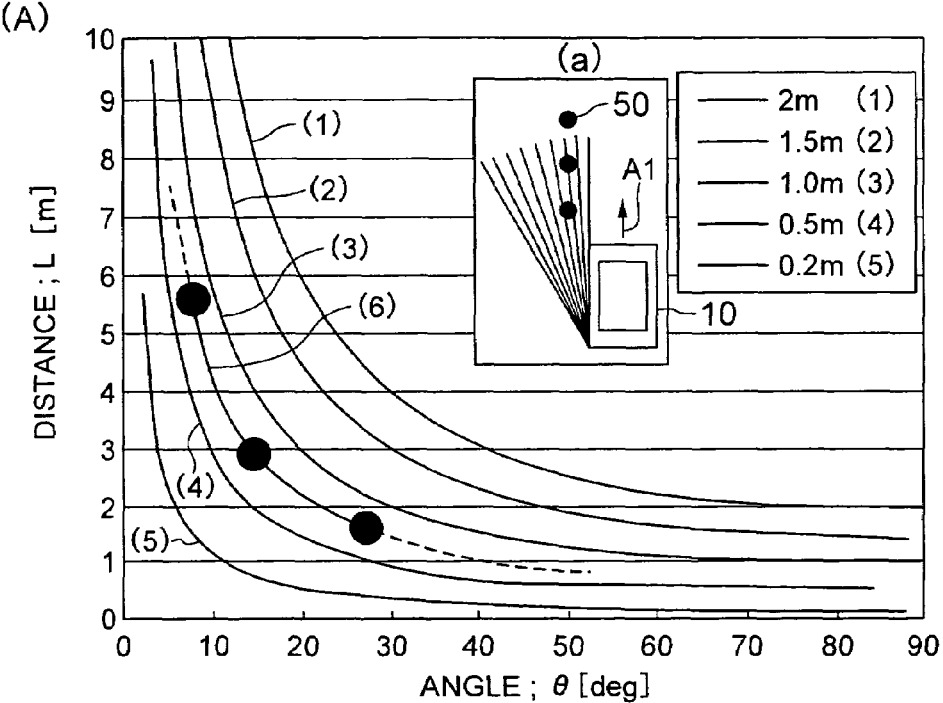
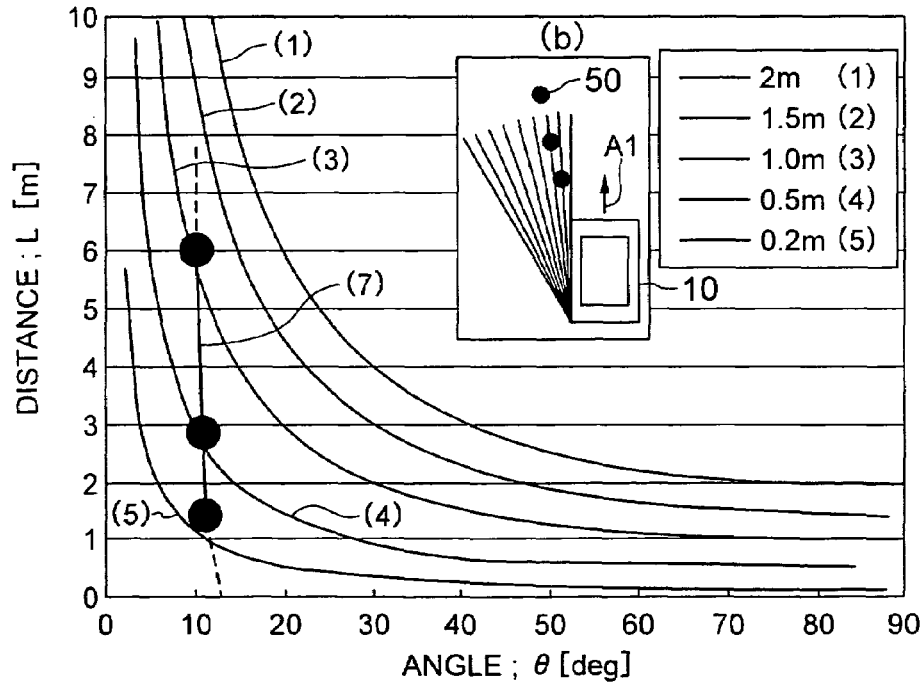

FIG. 7
(1)
(a) (b)
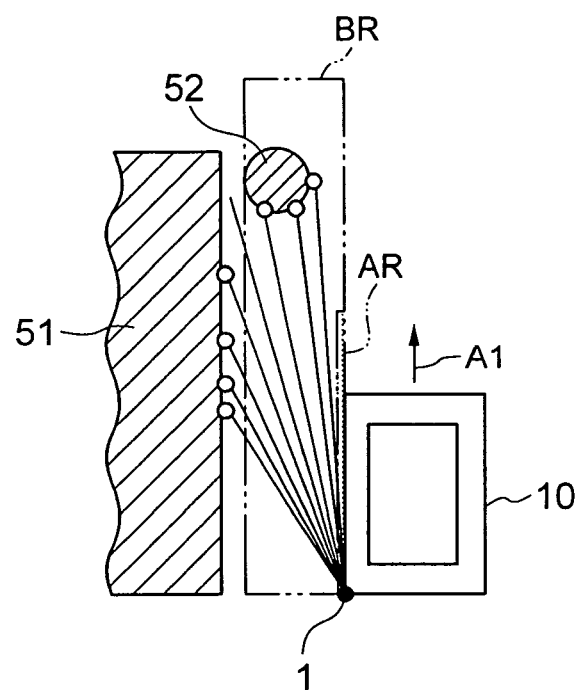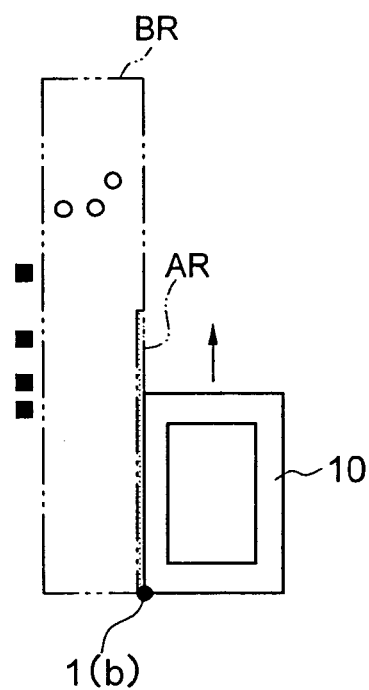
(2)
(a) (b)
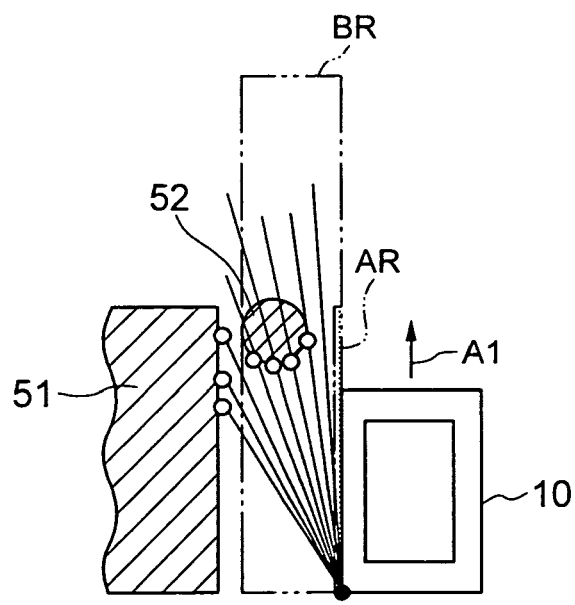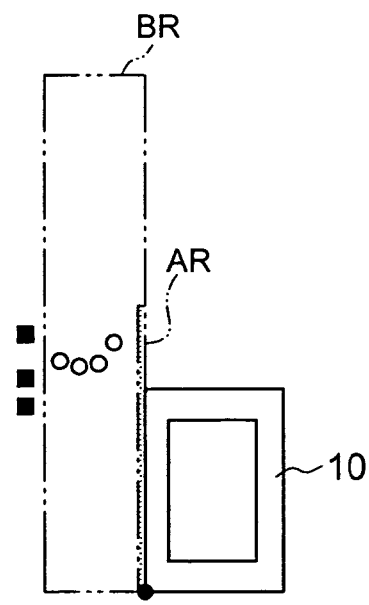

FIG. 8
(1)
(a)
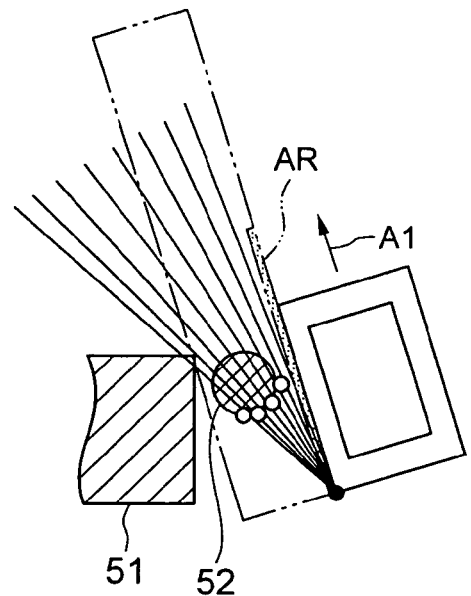
51  52
(b)
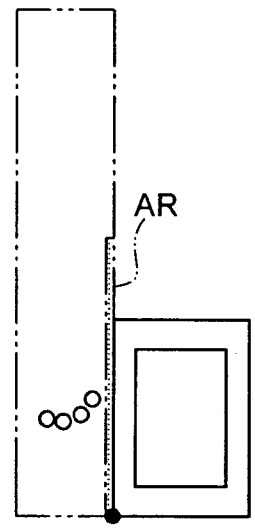
(2)
(a)
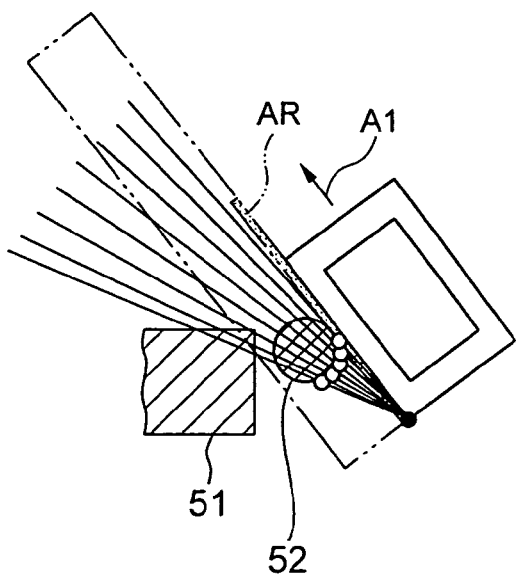
51  52
(b)
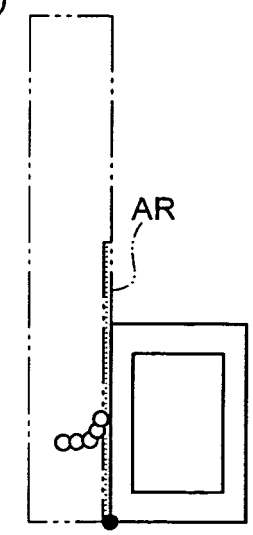

FIG. 11
(1)
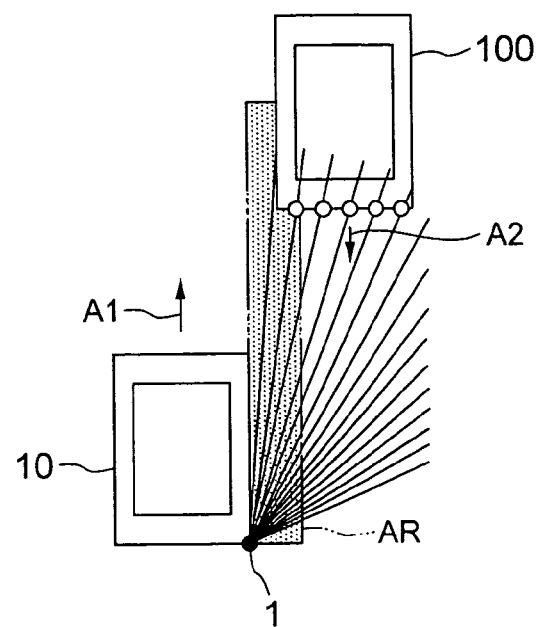
(2)
(a) 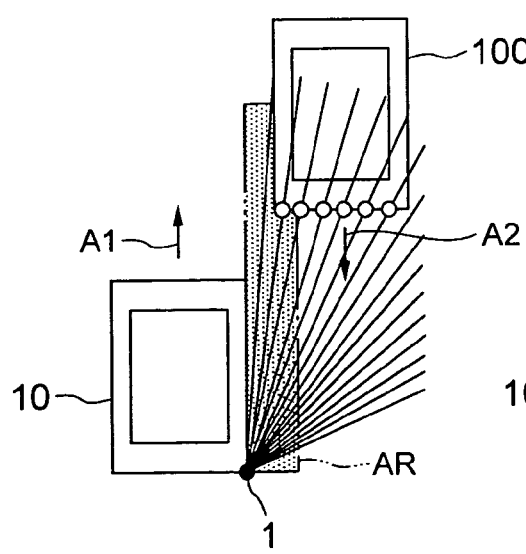   (b) 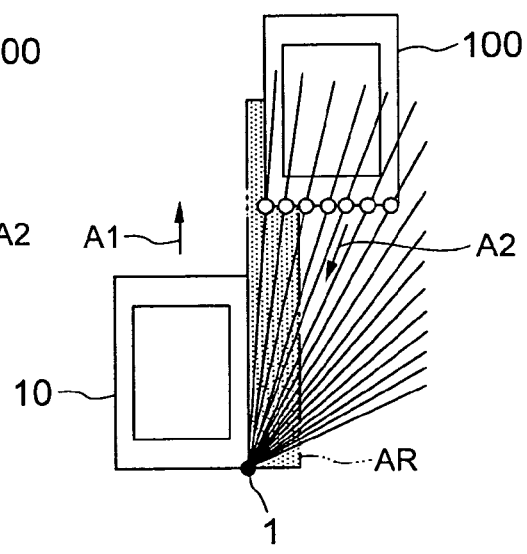

FIG. 13
(a)
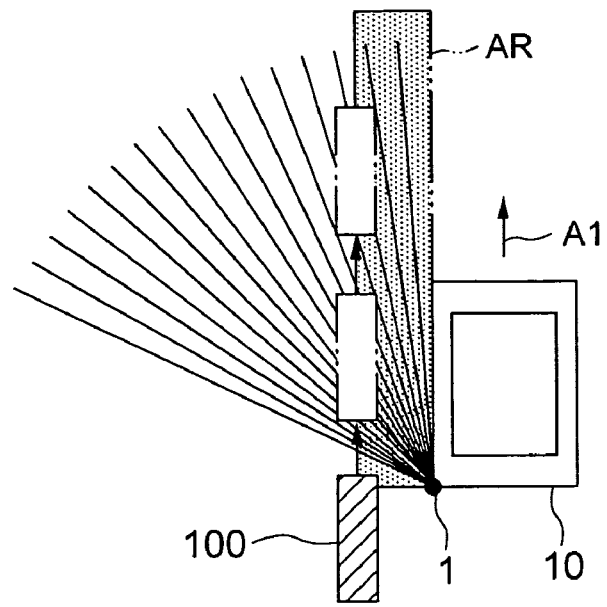
(b)
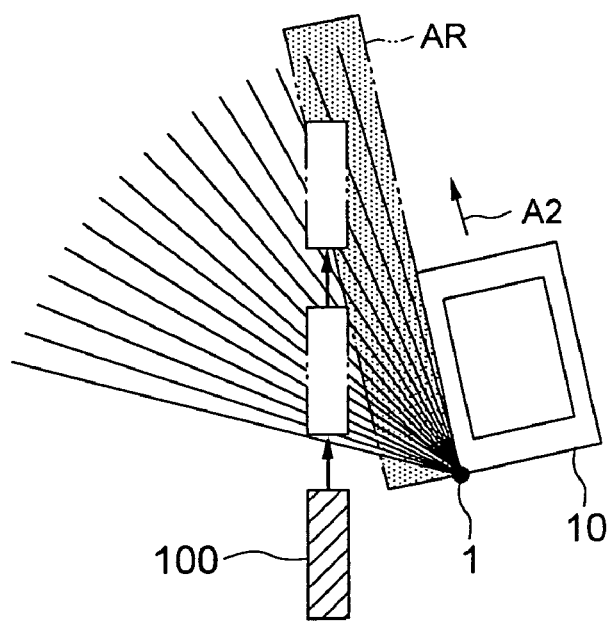

FIG. 15
(a)
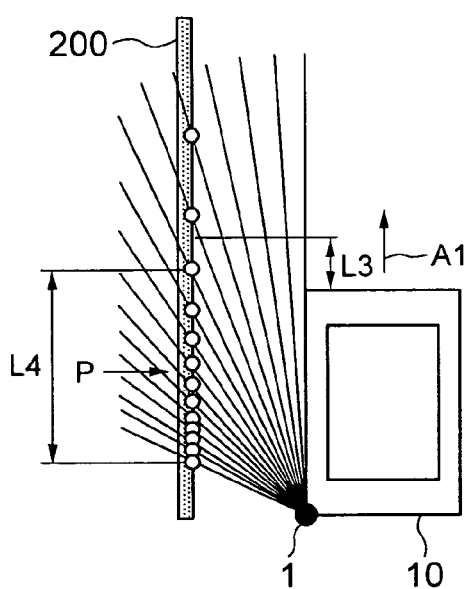
(b)
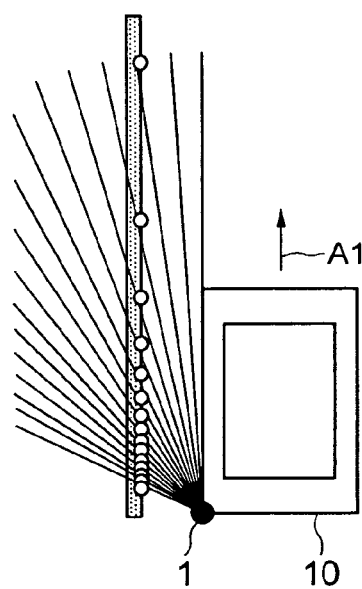
(c)
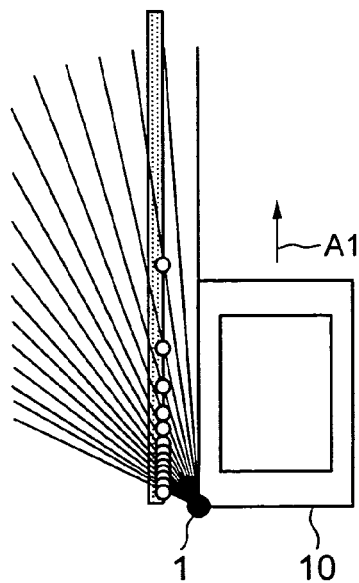
(d)
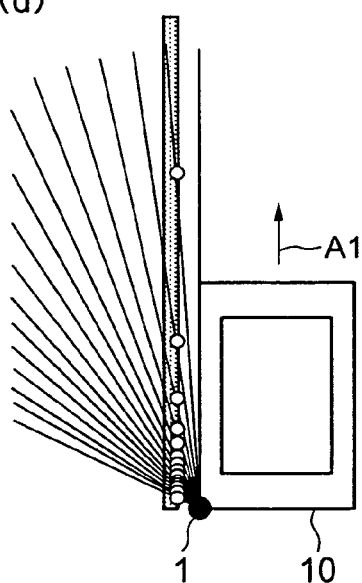

ALARMING SYSTEM FOR VEHICLE AND ALARM GENERATING METHOD FOR VEHICLE

BACKGROUND OF THE INVENTION

1. Field of the Invention

The present invention relates to an alarming system for vehicle and an alarm generating method for vehicle, and in particular, to a system and method for generating an alarm against an obstacle existing on the side of the vehicle and in front thereof.

2. Related Art

Conventionally, systems for detecting an obstacle or the like with which the vehicle may contact during traveling and for generating an alarm in the vehicle have been developed. These systems intend to urge by the alarm the occupants, in particular, the driver, to take caution so as to avoid the contact with the obstacle.

Such systems are disclosed in the Japanese Patent Application Laid-open No. 07-291064 and the Japanese Patent Application Laid-open No. 2000-339595, which are described below. The system disclosed in the Japanese Patent Application Laid-open No. 07-291064 detects, using image processing, an obstacle existing in the periphery of the vehicle, and generates an alarm corresponding to the distance to the obstacle. The system disclosed in the Japanese Patent Application Laid-open No. 2000-339595 predicts an obstacle existing on the traveling locus calculated from the steering angle of the vehicle, and generates an alarm if a contact may occur.

In the conventional examples, however, there are following disadvantages. First, in the system disclosed in the Japanese Patent Application Laid-open No. 07-291064, an obstacle is detected using image processing. Therefore, it is difficult to recognize an object existing far away, which causes a problem that the recognizing accuracy is low. In particular, it is difficult to cope with environmental changes such as whether, and also difficult to perform high-speed processing. In turn, in order to realize high-speed processing, a CPU, for example, having higher performance must be used. This results in an increase in the cost.

In the system disclosed in the Japanese Patent Application Laid-open No. 2000-339595, a possibility of a contact with an obstacle is determined by calculating the traveling locus of the vehicle, when turning right or left, for example. Therefore, if the obstacle is a pedestrian, a two-wheel barrow (e.g. motorcycle, bicycle) or the like, that is, a moving obstacle, the movement of the obstacle cannot be predicted. This causes a problem that a faulty determination may take place, since the system cannot effectively cope with a moving obstacle.

SUMMARY OF THE INVENTION

It is an object of the present invention to provide an alarming system for vehicle and an alarm generating method for vehicle, in which the defects in the conventional examples are improved, and in particular, which are capable of determining whether caution is required or not against an moving obstacle and effectively urging the occupants to take caution, by generating an alarm with high accuracy and avoiding a faulty alarm.

Therefore, the present invention is so configured that in a vehicle, an obstacle detecting means for detecting obstacle data which is data related to the position of an obstacle existing on the side of a vehicle or in front thereof, a computer for computing the obstacle data detected, and an alarming means for alarming occupants of the vehicle, are mounted. The computer includes: an alarming area setting function which sets, as an alarming area, a range having a certain distance from the side part of the vehicle and an extended line of the side part in a forward direction of the vehicle, in an outward direction lateral to the side part of the vehicle; an obstacle tracking function which tracks the obstacle based on the obstacle data detected by the obstacle detecting means; a traveling locus calculating function which calculates a traveling locus, relative to the vehicle, of the obstacle tracked by the obstacle tracking function, and predicts the traveling locus of the obstacle thereafter; a traveling locus determining function which determines whether the traveling locus of the obstacle enters into the alarming area; and an alarm generating function which gives an alarm to the occupants by the alarming means when the traveling locus is determined to enter into the alarming area.

With this configuration, first, an obstacle existing outside the vehicle is detected and the direction and the distance thereof and the like are measured. Further, each obstacle is kept detected and tracked, and the traveling locus of the obstacle is calculated and the traveling locus thereafter is also predicted. Then, from the traveling locus, it is determined whether the obstacle will enter into the alarming area of the vehicle. Then, if the obstacle is predicted to enter into the alarming area considering from the result of the determination, an alarm is generated. Therefore, even when the obstacle is moving, it can be determined with high accuracy whether the obstacle may contact the vehicle by calculating the traveling locus relative to the vehicle, whereby it is possible to generate a more effective alarm so as to urge the occupants to take caution.

Further, it is preferable that the obstacle detecting means be mounted on a predetermined part at a rear of the side part of the vehicle, and detect data related to the position of the obstacle existing on the side of the vehicle and in front thereof. With this configuration, an obstacle within a range which requires caution can be detected by at least one obstacle detecting means, whereby processing to determine the necessity of an alarm can be done. That is, there is no need to mount a large number of obstacle detecting means, which enables to reduce the cost and to prevent the complexity of the obstruct detecting processing.

Further, it is preferable that the computer include a preliminary area setting function which sets a preliminary alarming area having a range wider than that of the alarming area, and that the obstacle tracking function detect an obstacle existing within the preliminary alarming area and track the obstacle. With this configuration, the obstruct which is tracked by the obstruct tracking function is limited to those existing within the preliminary alarming area which is a predetermined range from the vehicle. This enables to prevent the number of obstacles to be subject to processing from being enlarged, and to simplify and speed up the processing.

Further, it is preferable that the present invention be so configured that a traveling state detecting means for detecting data related to the traveling state of the vehicle is mounted in the vehicle, and the alarming area setting function sets the alarming area based on traveling state data of the vehicle. With this configuration, the traveling speed and the steering angle of the vehicle and the like, which constitute data related to the traveling state, are detected, and based on such data, the alarming area is set. For example, when the traveling speed is high, the alarming area is set to be wider, and when the steering angle is detected, the alarming area is set in such a direction. Then, based on the alarming area set, it is determined whether an alarm is generated. Therefore, a more effective alarm can be generated corresponding to the traveling state of the vehicle.

Further, it is preferable that the present invention be so configured that a manipulation unit for changing the alarming area, which is manipulated by an occupant of the vehicle to thereby change the alarming area, is mounted in the vehicle, and the alarming area setting function sets the alarming area according to the manipulated state of the manipulation unit for changing the alarming area. With this configuration, if the driver wants to set the alarming area to be larger, the driver can manipulate the manipulation unit so as to set the alarming area to be larger. Therefore, the alarming area can be set according to the skill of the occupants of the vehicle, in particular, the driver of the vehicle, which enables to set so as to generate an alarm more effectively.

Further, it is preferable that the present invention be so configured that the computer includes a function of recording obstacle detecting state data, which function records data related to the detected state of the obstacle during traveling of the vehicle, and the alarming area setting function sets the alarming area based on the obstacle detecting state data. With this configuration, first, the obstacle detecting state of the past is recorded into the computer of the vehicle. Then, when driving the vehicle later, an appropriate alarming area is set automatically corresponding to the past approaching state to obstacles of the driver, which is the obstacle detecting state data. For example, in a case that there were many obstacles to which the driver approached with close distance, a large alarming area is set. As such, the alarming area is appropriately set corresponding to the skill of the driver.

Further, it is preferable that the present invention be so configured that the traveling locus determining function determines whether the traveling locus of the obstacle contacts the vehicle, and if the traveling locus is determined not to contact the vehicle, the alarm generating function stops the alarm which has been generated by the alarming means. With this configuration, it is determined from the traveling locus of the obstacle whether the obstacle may contact the vehicle, and if the traveling locus is determined not to contact the vehicle although it has entered the alarming area, an alarm which has been generated is stopped. Therefore, it is possible to prevent the alarm from being kept generated, and also to prevent annoyance caused by the alarm.

Further, it is preferable that the present invention be so configured that the computer further includes a detecting range limiting function which, if the length of the obstacle in a back and forth direction of the vehicle detected at almost the same time has a predetermined length or more, limits a range for detecting the obstacle by the obstacle detecting means to a predetermined range provided on the side of the vehicle and in front thereof, and the obstacle tracking function tracks a middle point of the length of the obstacle when the detecting range of the obstacle is limited by the detecting range limiting function. Here, when the detecting range of the obstacle is limited by the detecting range limiting function, it is more preferable that the alarming area setting function set the alarming area to have a distance shorter than a distance from the side of the vehicle to the obstacle. With this configuration, first, if the obstacle detected on the side of the vehicle has a predetermined length along the vehicle, the obstacle is recognized as a wall. At this time, the obstacle detecting area in front of the side of the vehicle is limited to a certain range from the front of the vehicle. Then, the middle point of the wall, which is the obstacle, is tracked, to thereby determine whether an alarm is required. Therefore, processing data which should be taken into account can be reduced, and an alarm can be generated effectively against the excessive pulling over to the wall.

Further, it is preferable that the obstacle tracking function be so configured as to calculate a traveling speed of each obstacle from the obstacle data of each obstacle detected before and after in time within a certain range, and through comparing respective traveling speeds, to track those having the traveling speeds which fall within a predetermined acceptable range as a same obstacle. With this configuration, by using image data as obstacle detecting data at each certain time, a process to track by performing matching of objects can be prevented. This enables to track objects by a simple calculation process, and to determine the necessity of an alarm in high speed.

The present invention also provides an alarm generating method for vehicle. In the method, an obstacle detecting means for detecting obstacle data which is data related to the position of an obstacle existing on the side of the vehicle and in front thereof, a computer for computing the obstacle data detected, and an alarming means for alarming the occupants of the vehicle, are mounted in the vehicle, and an alarm is generated by the calculation of the computer. The method comprises the steps of: tracking an obstacle, in which an obstacle existing on the side of a vehicle or in front thereof is tracked based on the obstacle data detected by the obstacle detecting means; calculating a traveling locus, in which a traveling locus, relative to the vehicle, of the obstacle tracked in the step of tracking the obstacle is calculated, and also the traveling locus thereafter is predicted; following the step of calculating the traveling locus at a latest, setting an alarming area, in which a range having a certain distance from the side part of the vehicle and an extended line of the side part in a forward direction, in an outward direction lateral to the side part of the vehicle, is set as an alarming area; determining the traveling locus, in which the traveling locus of the obstacle is determined whether it enters into the alarming area; and generating an alarm, in which an alarm is given to the occupants of the vehicle by the alarming means when the traveling locus is determined to enter into the alarming area. With this configuration, the same effects as aforementioned can be obtained.

Further, the present invention also provide a system comprising: a obstacle detecting means for detecting obstacle data which is data related to the position of an obstacle existing on the side of a vehicle or in front thereof; a computer for computing the obstacle data detected; and an alarming means for alarming occupants of the vehicle; which are mounted in the vehicle. The computer includes: an obstacle tracking function which tracks the obstacle based on the obstacle data detected by the obstacle detecting means; a traveling locus calculating function which calculates a traveling locus of the obstacle relative to the vehicle, and predicts the traveling locus thereafter; a traveling locus determining function which determines whether the traveling locus of the obstacle contacts the vehicle; and an alarm generating function which, when the traveling locus is determined to contact the vehicle, gives an alarm to the occupants of the vehicle by the alarming means. Accompanying this configuration, the present invention also provides a method, in which an obstacle detecting means for detecting obstacle data which is data related to the position of an obstacle existing on the side of the vehicle and in front thereof, a computer for computing the obstacle data detected, and an alarming means for alarming the occupants of the vehicle, are mounted in the vehicle, and an alarm is generated by the calculation of the computer. This method comprises the steps of: tracking an obstacle, in which an obstacle is tracked based on the obstacle data detected by an obstacle detecting means; calculating a traveling locus, in which a traveling locus, relative to the vehicle, of the obstacle tracked is calculated, and the traveling locus thereafter is predicted; determining the traveling locus, in which the traveling locus of the obstacle is determined whether it contacts the vehicle; and generating an alarm, in which an alarm is given to the occupants of the vehicle by the alarming means when the traveling locus is determined to contact the vehicle.

With this configuration, it is possible to check whether the predicted traveling locus of the obstacle may contact the vehicle as described above, and when it is determined to contact the vehicle, an alarm is generated. Therefore, even if an obstacle predicted to enter the alarming area, as described above, exists, an alarm is not generated against an obstacle having low possibility to contact the vehicle, which can effectively prevent a faulty alarm from being generated.

BRIEF DESCRIPTION OF THE DRAWINGS

FIGS. 5(A) and 5(B) are charts, each of which shows a traveling locus of an obstacle;

FIGS. 7(1)(*a*), 7(1)(*b*), 7(2)(*a*) and 7(2)(*b*) are illustrations showing situations of detecting an obstacle in the operational example 1, wherein FIG. 7(1)(*a*) shows a state of detecting the obstacle at a time, FIG. 7(1)(*b*) shows the relationship between the obstacle detected at the time of FIG. 7(1)(*a*) and the vehicle, and FIGS. 7(2)(*a*) and 7(2)(*b*) show a state of detecting the obstacle and the relationship between the obstacle and the vehicle, after a certain period has passed from the time of FIGS. 7(1)(*a*) and 7(1)(*b*);

FIGS. 8(1)(*a*), 8(1)(*b*), 8(2)(*a*) and 8(2)(*b*) are illustrations showing situations of detecting the obstacle in the operational example 1, continuing from FIGS. 7(2)(*a*) and 7(2)(*b*), wherein FIGS. 8(1)(*a*) and 8(1)(*b*) show a state of detecting the obstacle and the relationship between the obstacle and the vehicle, after a certain period has passed from the time of FIGS. 7(2)(*a*) and 7(2)(*b*), and FIGS. 8(2)(*a*) and 8(2)(*b*) show a state of detecting the obstacle and the relationship between the obstacle and the vehicle, after a certain period has passed from the time of FIGS. 8(1)(*a*) and 8(1)(*b*);

FIGS. 11(1), 11(2)(*a*) and 11(2)(*b*) are explanatory illustrations showing the positional relationship between the vehicle and the obstacle; wherein FIG. 11(1) shows a state at a time, and in particular, FIG. 11(2)(*a*) shows a case that the own vehicle and an oncoming vehicle go by each other keeping a certain distance, and FIG. 11(2)(*b*) shows a case that the oncoming vehicle is approaching the own vehicle;

FIGS. 13(*a*) and 13(*b*) are explanatory illustrations, each of which shows a positional relationship between the vehicle and the obstacle in an operational example 3 of the first embodiment;

FIGS. 15(*a*) through 15(*d*) are explanatory illustrations, each of which shows a relationship between the vehicle and the obstacle in a third embodiment.

PREFERRED EMBODIMENTS OF THE INVENTION (First Embodiment)

A first embodiment of the present invention will be described below with reference to FIGS. 1 through 13.

(Overall Structure)

Figure 1:
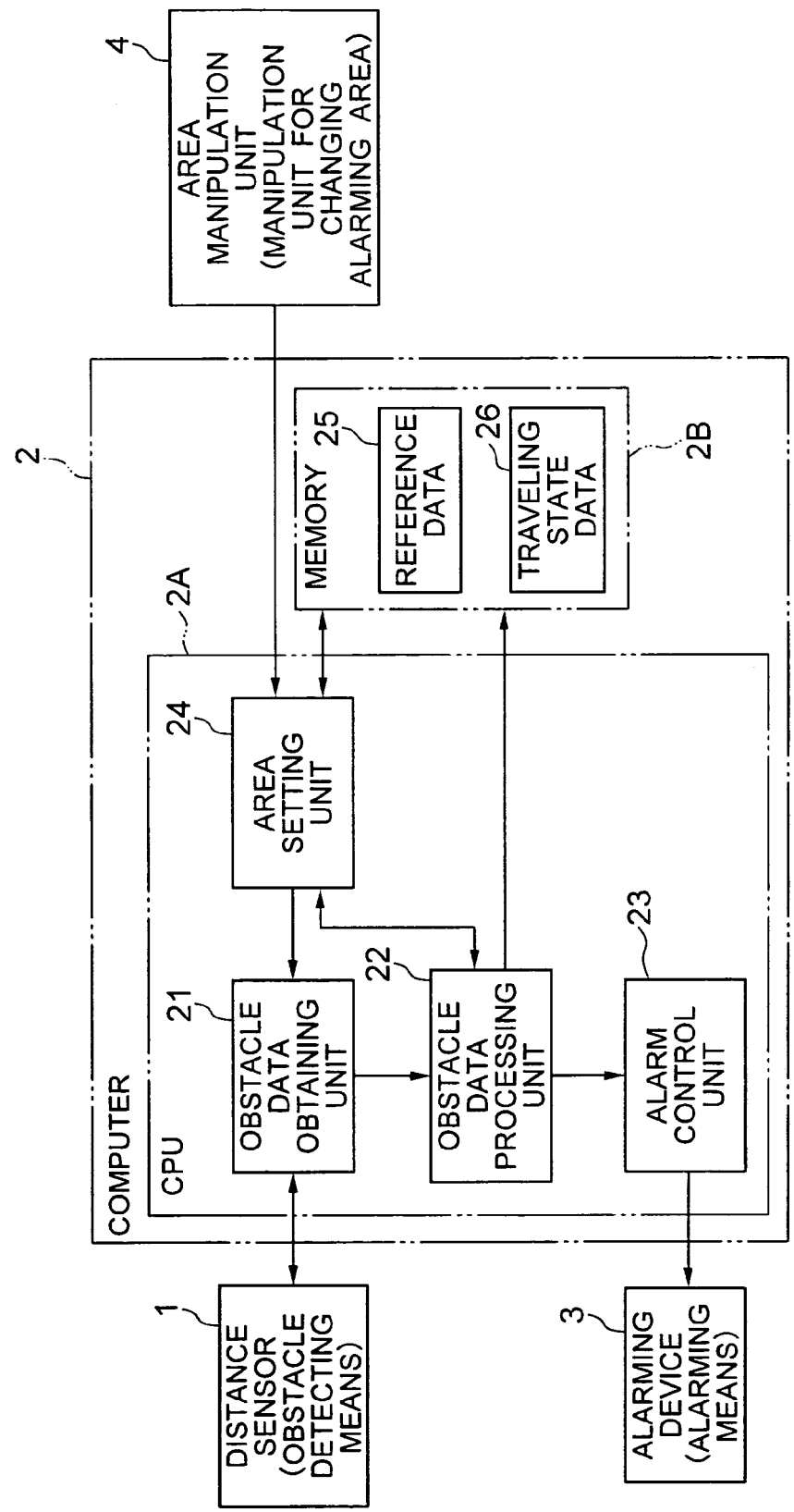
FIG. 1 is a function block diagram showing the structure of a first embodiment of the present invention.

As shown in FIG. 1, an alarming system for vehicle according to the first embodiment includes, in the vehicle 1 as the basic structure, an obstacle detecting means 1 for detecting obstacle data which is data relating to the position of an obstacle existing on the side of the vehicle 10 and in front with reference to the side position, a computer 2 for computing the obstacle data detected, and an alarming means 3 for alarming the occupants of the vehicle. The system is so configured that when the computer 2 determines it is required to take caution against the obstacle based on the obstacle data detected, an alarm is generated by the alarming means 3. This will be explained in detail below. Note that although a distance sensor is used as the obstacle detecting means 1 in FIG. 1, it is not limited to the distance sensor.

(Vehicle)

The vehicle 10 in which the alarming system for vehicle, or the present invention, is mounted is a four-wheel vehicle. The system detects an obstacle located on the side of the vehicle 10 and in front with reference to the side position, and generates an alarm, thereby to urge caution against the obstacle when, for example, turning right or left so as to avoid a contact with the obstacle. Note that the vehicle 10 is not limited to a four-wheel vehicle, and it may be a heavy vehicle with six or more wheels such as a truck, or a vehicle with two or three wheels.

(Alarming Means)

The alarming means 3 shown in FIG. 1 is provided inside the vehicle 10, and an alarming device 3, which generates a sound for inviting the driver's attention, is used. Alternatively, the alarming means 3 shown in FIG. 1 may be one which blinks an indication for alerting on an instrument panel. Further, the alarming means 3 may be formed by combining the aforementioned means for alerting, or the alarming means 3 may have another structure so as to invite the driver's attention. The operation of the alarming device 3 is controlled by the computer 2 mounted in the vehicle 10, as described later.

Further, as an output of an alarm by the alarming device 3, several patterns are prepared. For example, three patterns of alarming sounds are prepared, and a particular alarming sound will be output corresponding to the determined degree of caution, as described later. In the case of alarming with a display, the flashing pattern of the alarm display will be changed.

(Obstacle Detecting Means)

As the obstacle detecting means 1 shown in FIG. 1, a distance sensor 1 is used, which sensor detects an obstacle existing outside the vehicle 10, and detects the direction and the distance constituting data related to the position of the obstacle. More specifically, the distance sensor 1 used as the obstacle detecting means consists of a laser radar. Here, the laser radar is a device which emits a near-infrared laser beam to the obstacle detection range, and receives the return beam reflected at the obstacle, to thereby measure, from the time difference, the distance to the obstacle.

Figure 2:
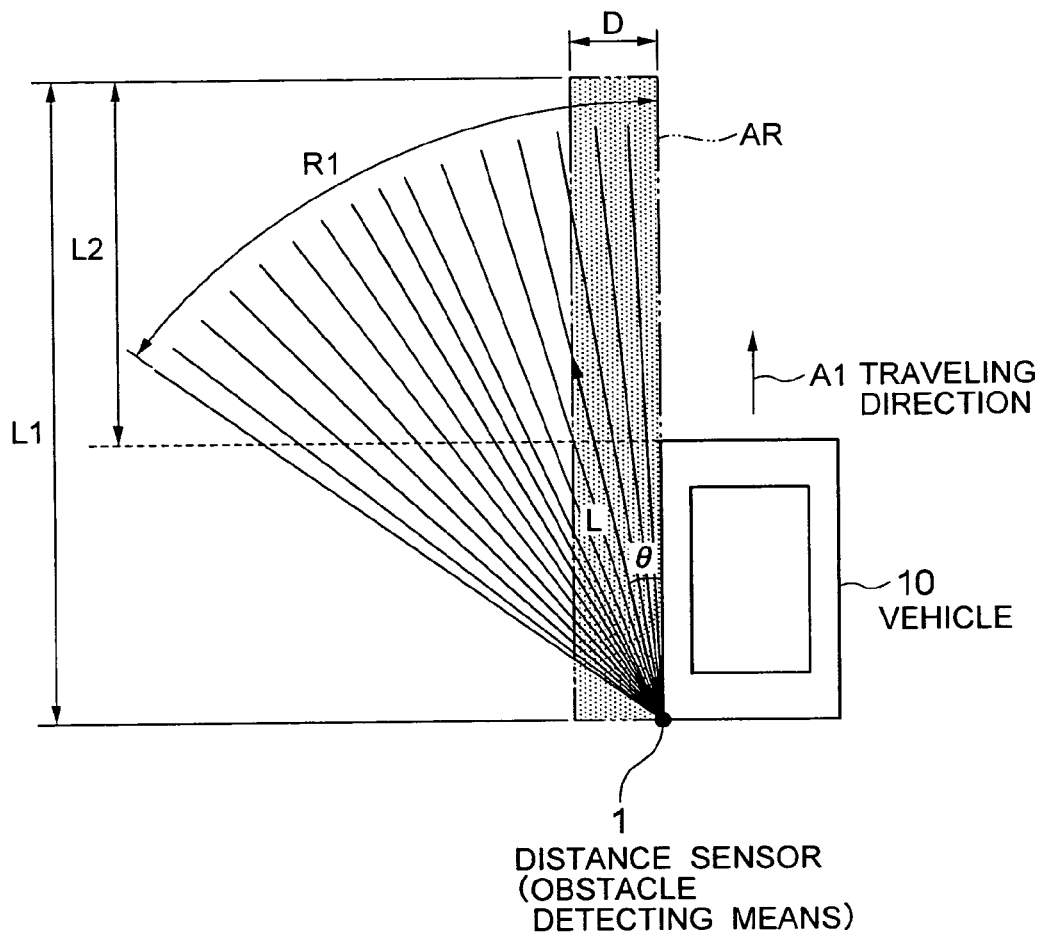
FIG. 2 is an explanatory illustration for explaining a range of detecting an obstacle by the obstacle detecting means disclosed in FIG. 1.
Figure 3:
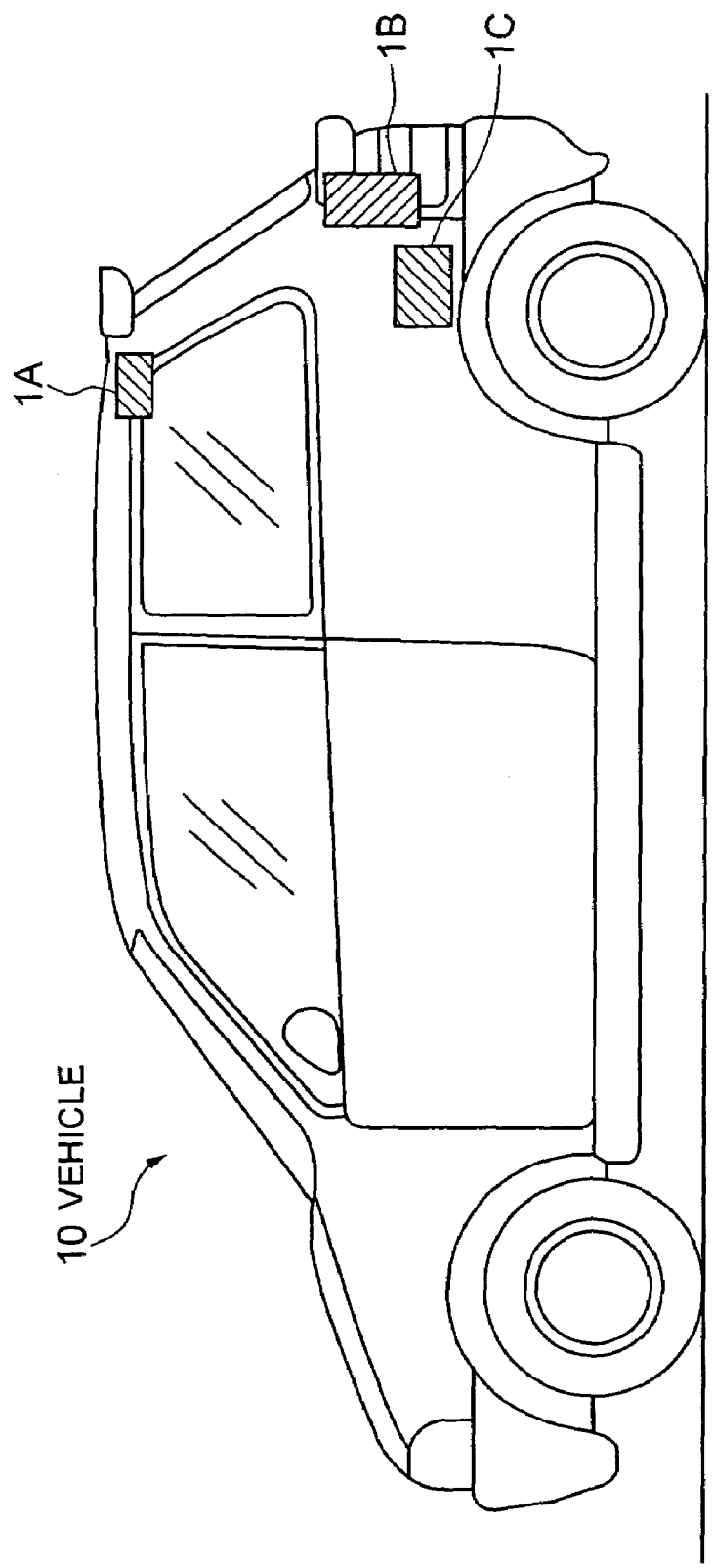
FIG. 3 is an explanatory illustration showing a mounting position of the obstacle detecting means disclosed in FIG. 1.

In the present embodiment, the distance sensor 1 is provided at the rear of side part of the vehicle 10 as shown in FIGS. 2 and 3. The arrow A1 shown in FIG. 2 is assumed to be the traveling direction of the vehicle 10. More specifically, the distance sensor 1 may be mounted at any position within the shaded portions shown by the reference numerals 1A, 1B and 1C. The distance sensor 1 provided to such a position scan-emits a laser beam at every predetermined angle ranging from the forward direction along the side part of the vehicle to gradually the side which is almost lateral to the vehicle. Then, the distance sensor 1 obtains two-dimensional distance data of the obstacle existing within the range. In other words, provided that the forward direction along the side of the vehicle is the angle of 0°, the distance sensor 1 measures the angle θ between the side and the emitting laser, and the distance L to the obstacle existing on the angle θ. In order that the distance sensor 1 can also detect the obstacle located in front almost along the side of the vehicle, as described above, the distance sensor 1 is preferably mounted on the vehicle while protruding laterally within the range of protruding amount permitted under the law concerning road and traffic.

Note that the mounting state of the distance sensor 1 is not limited to the aforementioned. Further, the mounting position of the distance sensor 1 is not limited to the positions shown by the reference numerals 1A, 1B and 1C in FIG. 3.

As shown in FIG. 2, an obstacle within the sector range shown by the reference numeral R1 can be detected in one cycle of scanning performed by the distance sensor 1. More specifically, the distance sensor 1 continuously detects, at each predetermined angle within the detection range, distance data to the obstacle existing in the angular direction, and outputs the angle and distance data to an obstacle data obtaining unit 21 in the computer 2 shown in FIG. 1, which will be described later. The computer 2 sets continuing data numbers corresponding to the scanning angle of the distance sensor 1, associates the data numbers with the data of the distance L and the angle θ to the obstacle, to thereby obtains, from the data numbers, the distance L and the angle θ to the obstacle of that time.

The operation of the distance sensor 1, which is the laser radar, is controlled by the computer 2 and the obtainment of the obstacle data is carried out by the computer 2, as described later. Therefore, a part of the computer 2 also serves as the obstacle detecting means 1.

Although the laser radar has been explained as the distance sensor 1 in the above, the distance sensor 1 is not limited to this. The distance sensor 1 may be one which can detect the distance to the obstacle, such as a millimeter wave radar, a scan-type photoelectric tube, a scan-type ultrasonic sensor, or a range finder capable of measuring the image and the distance simultaneously. Further, it may be one which can obtain not only two-dimensional distance information but also three-dimensional distance information.

Moreover, although the distance sensor 1 is provided to the left side, facing forward, of the vehicle in FIG. 2, it is not limited to this configuration. The distance sensor 1 may be provided to the right side so as to detect a vehicle traveling the opposite lane.

As described above, by mounting the distance sensor 1 at the rear of the side part of the vehicle, it is possible to detect an obstacle within the range requiring caution and to determine whether an alarm is necessary, by at least one obstacle detecting means. Therefore, multiple distance sensors 1 are not required and the obstacle detecting processing becomes simple. That is, it is not required to process information from multiple distance sensors, whereby high-speed processing can be achieved. Further, it is possible to reduce the cost because of the reduction in the number of sensors.

(Computer)

The computer 2 is provided inside the vehicle 10. The computer 2 is a typical computer having a CPU 2A as a computing means, and a memory 2B such as a ROM or RAM as a storing means, as shown in FIG. 1. The computer 2 operates in such a manner that it obtains obstacle data detected by the distance sensor 1, computes the data, and controls the alarming device 3 so as to generate an alarm. In order to realize this operation, a program which is an instruction to realize processing described below is read out by the CPU 2A and installed in the CPU 2A, whereby each processing unit 21, 22, 23, 24 is formed in the CPU 2A. The processing units are, an obstacle data obtaining unit 21, an obstacle data processing unit 22, an alarm control unit 23, and an area setting unit 24, respectively.

The aforementioned each processing unit will be specifically explained. The area setting unit 24 has an alarming area setting function which sets an alarming area AR where the occupants of the vehicle 10 must take caution. Here, the alarming area AR means a range from the side part of the vehicle where the distance sensor 1 is mounted and the extended line thereof in a forward direction of the vehicle with reference to the side part to a certain distance in an outward direction lateral to the side part of the vehicle. In other words, as shown in FIG. 2, the alarming area AR is a rectangular area formed on the side of the vehicle (see the half-tone dot meshed area in FIG. 2).

In the alarming area AR, the length L1 along the traveling direction A1 of the vehicle 10 is set to combine the whole length of the vehicle 10 and the distance L2 extending forwardly from the forefront of the vehicle 10. Here, it is assumed that the length L1 is set to 10 m, and the distance L2 is set to 6 m, for example. The width D of the alarming area AR is set considering the possibility of the vehicle 10 contacting the obstacle. In the embodiment, the width D of the alarming area AR is set to 1 m, for example.

Here, the alarming area AR is set as reference data 25 which has been stored in the memory 2B. That is, the dimensions of the length L1 and the width D of the alarming area AR as the reference data 25 is set within a range where the driver of the vehicle typically needs to take caution during driving.

However, the alarming area AR is not the fixed one, and the setting of the area can be changed to be larger or smaller according to the skill of the driver, or it can be changed to a range where the driver recognizes to need caution. In particular, the width D of the alarming area AR is preferably set wider if the driver is a beginner, and an area manipulation unit 4 (manipulation unit for changing the alarming area) for changing the setting of the area is provided inside the vehicle.

The area manipulation unit 4 is, for example, a dialing-type manipulation unit having scales indicating a value of the width D. This is provided near the instrument panel of the vehicle, and by rotating the dial, the width D of the alarming area is set. A signal instructing the width D is informed from the area manipulation unit 4 to the area setting unit 24. When receiving the signal, the area setting unit 24 sets the area to the informed width D. In a case that the scale provided to the area manipulation unit 4 indicates a pictograph such as "For Beginners" and not the specific value of the width D, a signal indicating that the pictograph of "For Beginners" has been selected is informed to the area setting unit 24, and the area setting unit 24 reads out the reference data 25 in the memory 2B. As the reference data 25, an alarming area with a large width D for beginners has been set/stored, and based on this data, the alarming area AR is set. Therefore, if the driver wants to set the alarming area AR to be larger, the driver can set the large alarming area by manipulating the area manipulation unit 4. In contrast, the alarming area can be set to be smaller by manipulating the area manipulation unit 4 if the driver having enough experience in driving wants to set small alarming area AR so as to prevent excessive alarming. Accordingly, the alarming area in which an alarm is generated can be set according to the skill of the occupants, in particular, the driver of the vehicle, whereby the alarming area can be set to effectively generate an alarm.

Further, the alarming area setting function provided to the area setting unit 24 includes a function of setting the alarming area AR based on the obstacle detecting state data which is data related to the past detecting states of obstacles during traveling. The obstacle detecting state data is traveling state data 26 stored in the memory 2B of the computer 2, and the traveling states of the vehicle are stored by the obstacle data processing unit 22 of the CPU 2A, as described later. The traveling state data 26 includes information such as the number of states that caution was required in the past, the distance of an obstacle approaching the vehicle and the numbers, and in which side of the vehicle the alarm was generated. The area setting unit 24 refers to the data, and if the number of alarms being generated is large, or if the number of approaching a certain distance to the obstacle is large though alarm was not generated, the driver is determined as a beginner and the alarming area is set to be larger than the area set in the initial state. As another example, if the number of alarms being generated in the past is small, the area setting unit 24 sets the structure in which the alarming area is not set and an alarm is generated only when the traveling locus of the obstacle has a possibility to contact the vehicle, as described later. The aforementioned setting is realized by the driver manipulating the area manipulation unit 4.

Further, the area setting unit 24 has, in addition to the aforementioned alarming area setting function, a preliminary area setting function which sets a preliminary alarming area having a larger range than the alarming area AR. The preliminary alarming area is a range where the obstacle, which is to be subject to processing later, is detected by the distance sensor 1. The preliminary alarming area is formed in almost rectangle as same as the alarming area AR, and the dimension of the length L or the width D is set to be longer, whereby the area is set to be larger. However, the form of the detection range is not limited to rectangle, and may be in a sector form in accordance with the detection range of the distance sensor 1.

Then, the area setting unit 24 instructs the obstacle data obtaining unit 21 that only obstacles existing within the range of the preliminary alarming area are to be detected. Note that such an area is also set by being read out from the reference data 25 which has been stored in the memory 2B, and set based on the data. At this time, the area manipulation unit 4 indicates the data of the preliminary alarming area with the scales, and the corresponding area setting data is included in the reference data 25. Alternatively, the area setting unit 24 may set the preliminary area based on a signal which is output to the area setting unit corresponding to the state of being manipulated in the area manipulation unit 4.

Figure 4:
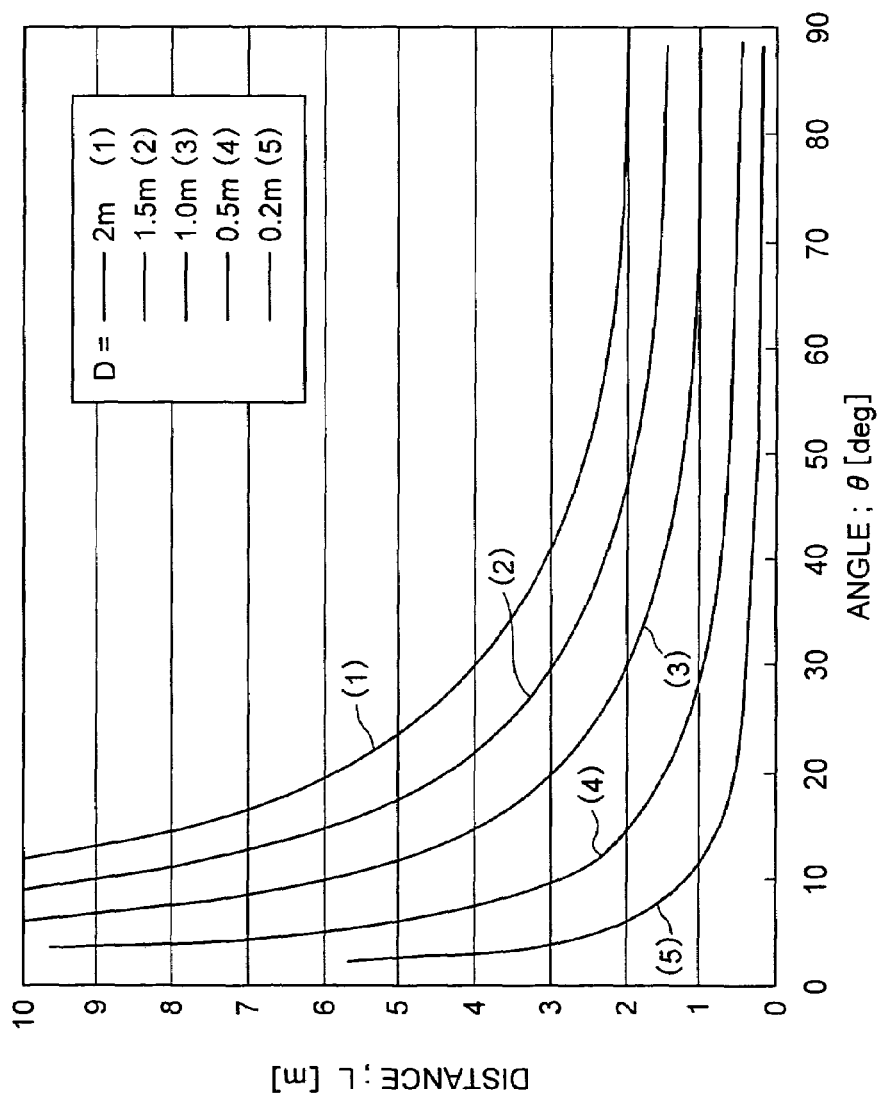
FIG. 4 is a chart showing an example of setting an alarming area.

Here, the alarming area AR is set using the angle θ and the length L as shown in FIG. 4, in the area setting unit 24, or on the program. The alarming area AR is shown as a different curve corresponding to the dimension of the width D. That is, the alarming area AR is set to be a curve determined by an equation of L=D/sin θ. The data related to this alarming area is output from the area setting unit 24 to the obstacle data processing unit 22, and serves as a criteria for determining whether an alarm is generated later. Note that in FIG. 4, cases of D=2 m, 1.5 m, 1.0 m, 0.5 m, and 0.2 m are exemplary shown, respectively ((1)–(5)).

Next, the obstacle data obtaining unit 21 will be explained. The obstacle data obtaining unit 21 controls the operation of the distance sensor 1 and obtains the obstacle data detected by the distance sensor 1. The obstacle data obtaining unit 21 controls the operation of the distance sensor 1 at intervals of a certain time period, and as shown in FIG. 2 for example, detects an obstacle within the detecting range R1 at that time, and obtains data of the direction (angle θ) and the distance (L). Then, the obstacle data obtaining unit 21 outputs the obtained data to the obstacle data processing unit 22.

Here, if the preliminary alarming area is set in the area setting unit 24, the obstacle data obtaining unit 21 obtains data related to the area from the area setting unit 24, and outputs data, which only relates to the obstacles existing in the area, to the obstacle data processing unit 22. That is, as for obstacles existing outside the preliminary alarming area, processing for determining whether caution is required for the obstacles is not performed. As such, obstacles tracked by the obstacle tracking function are limited to those existing within the preliminary alarming area which is a predetermined range from the vehicle 10. Therefore, it is possible to prevent the number of obstacles to be processed becoming enormous, and to provide high-speed processing by the obstacle data processing unit 22.

However, the obstacle data obtaining unit 21 may output every data obtained from the distance sensor 1 to the obstacle data processing unit 22. In this case, only data of the obstacles existing within the preliminary alarming area is processed by the obstacle tracking function of the obstacle data processing unit, which will be described later.

Next, the obstacle data processing unit 22 will be explained. The obstacle data processing unit 22 has an obstacle tracking function which tracks an obstacle based on the obstacle data detected by the distance sensor, a traveling locus calculating function which calculates a traveling locus, relative to the vehicle, of the obstacle tracked and predicts the traveling locus thereafter, and a traveling locus determining function which determines whether the traveling locus of the obstacle enters into the alarming area.

The obstacle data processing unit 22 first receives, by the obstacle tracking function thereof, distance distribution data for each interval of a certain time period output from the obstacle data obtaining unit 21, and performs grouping for data determined to belong to the same obstacle considering from the distance (L) and the direction (angle θ) thereof. For example, if the points on the obstacles scanned and detected almost at the same time are not distant and exist within the prescribed range, and the shape formed by these points is a certain shape (circle, straight line or the like), they area recognized as the same object. Since the aforementioned grouping has already been known, the detailed explanation is omitted. However, all detected points may be tracked as follows, without performing grouping.

Processing after the grouping will be explained. From the prescribed range of the distance distribution data which is before and after in time, objects considered to be the same object are selected. More specifically, if obstacles are detected continuously within a certain range, they are predicted as the same object. Here, if multiple objects are detected, they are preliminarily selected as potentially the same object. Then, the traveling distance thereof is calculated (if there are multiple candidates, each traveling distance is calculated), and the relative speed against the vehicle 10 is calculated. Then, data of traveling speed calculated in the processing so far of the object is read out from the memory 25, and the traveling speed is compared with the traveling speed newly calculated. If these traveling speeds fall within a certain range (for example, error of 1.5% or less), the obstacles with which the speeds were calculated are selected as the same object. At this time, the traveling speed thereof is stored in the memory 25 for use in further tracking.

In the initial state, the traveling speed of every detected object has not been detected so far. Therefore, from the distance distribution data within a certain range before and after in time, every object is assumed to be the same object, and multiple traveling speeds are calculated and temporarily held. Then, similarly, as for the distance distribution data before and after in time further detected within a certain range, every object is assumed to be the same object, and multiple traveling speeds are calculated. Then, the multiple traveling speeds of the detected obstacles are compared with one another, and those existing within the predetermined acceptable range are detected as the same object. Thereby, the traveling speed of the object is detected, so that the aforementioned tracking process of the object is performed using the traveling speed.

Next, following the tracking of the obstacle, the obstacle data processing unit 22 calculates, by the traveling locus calculating function thereof, the traveling locus of the obstacle using the tracking data. For example, an approximation indicating the traveling locus is calculated using the least squares method. FIGS. 5(A) and 5(B) show examples of calculating the traveling route. Here, (a) and (b) shown in respective Figures indicate changes, in terms of time, in relative positions of the vehicle 10 and the obstacle 50 (balloon) when the vehicle is traveling in a direction shown by the arrow A1. The points (balloons) in each graph show positions of the obstacle detected, and an approximation of the traveling locus of the moving object shown by the shift of these points is calculated. Further, the obstacle data processing unit 22 predicts, by the traveling locus calculating function thereof, the traveling locus thereafter from the traveling locus calculated. Here, the prediction of traveling route is carried out by calculating the approximation of the traveling locus and using the extended line thereof. Alternatively, the predicted route may be calculated using a statistical method (such as a Kalman filter). In the example shown in FIG. 5, a locus shown by the dotted line extending the approximation of the calculated traveling locus is used as a traveling prediction.

Then, the obstacle data processing unit 22, by the traveling locus determining function thereof, compares the predicted traveling locus of the obstacle, which has been calculated, with the data of the alarming area (see FIG. 4) set by the aforementioned area setting unit 24, and determines whether the traveling locus of the obstacle enters into the alarming area. Alternatively, the obstacle data processing unit 22 may determine, by the traveling locus determining function thereof, whether the traveling locus contacts the vehicle 10. For example, in FIG. 5(A), assuming the alarming area has D=0.5 m (curve (4)), the extended line of the traveling locus (6) is predicted not to enter into the alarming area, whereby the obstacle data processing unit does not determine to generate an alarm. Further, in a case that the alarming area has D=1 m (curve (1)) but it is so set that an alarm is not generated when there is no possibility to contact the vehicle 10, in the example shown in FIG. 5(A), the extended traveling locus will not contact the vehicle, that is, it does not contact L=0, and is close to the value around L=0.7, although entering into the alarming area. Thereby, it is determined not to generate an alarm. On the other hand, in FIG. 5(B), since it is predicted that the traveling locus (7) enters into the dangerous area and contacts the vehicle, it is determined as an obstacle to which caution is required. This information is output to the alarm control unit 23.

Further, when the obstacle data processing unit 22 determines, by the traveling locus determining function thereof, whether the traveling locus of the obstacle contacts the vehicle as described above, if it determines that the traveling locus does not contact but it already determined that the traveling locus entered into the alarming area, a signal indicating such a state is output to the alarm control unit 23. That is, if the obstacle data processing unit 22 once determined that an alarm should be generated, but then determines, from the traveling locus of the obstacle while continuing tracing of the obstacle, the obstacle will not contact the vehicle, the obstacle data processing unit 22 informs the alarm control unit 23 of such a state.

At this time, the obstacle data processing unit 22 further determines, by the traveling locus determining function thereof, the state requiring caution in stages. For example, the obstacle data processing unit 22 distinguishes a stage where the traveling locus enters into the alarming area and a stage where the traveling locus contacts the vehicle, and outputs each signal to the alarm control unit 23.

The alarm control unit 23, receiving the information, has an alarm generating function which gives an alarm to the occupants of the vehicle by the alarming device 3. Thereby, an alarm with sound or an alarm with indication is generated, so that the driver can take caution against the obstacle.

The alarming device 3 is so controlled as to generate an alarm in different patterns for the time receiving a signal of the stage where the traveling locus enters into the alarming area and the time receiving a signal of the stage where the traveling locus contacts the vehicle. For example, if a sound is output as an alarm, the alarming device 3 is so controlled as to generate different alarming sounds. With this configuration, in a case that an alarm, indicating the traveling locus of the obstacle has a possibility to enter into the alarming area, has already generated, and then the alarming pattern changes since the obstacle may contact the vehicle, the driver can take further caution.

Further, the alarm control unit 23 also has an alarm stopping function which stops the alarm when the alarm has been generated by the alarming device 3 but then the alarm control unit 23 receives information that the obstacle is determined not to contact the vehicle. The alarm control unit 23 determines, by the alarm stopping function thereof, whether there is a possibility that the distance of the obstacle becomes 0 against the vehicle from the traveling locus of the obstacle, and if it determines that the traveling locus will not contact the vehicle although entered into the alarming area, the alarm control unit 23 stops the alarm which has been generated. Therefore, it is possible to prevent the alarm from being kept continuing, and to prevent the annoyance caused by the alarm.

The obstacle data processing unit 22 described above further includes a function of recording obstacle detecting state data, which function records data related to the detected state of the obstacle during traveling of the vehicle. The obstacle data processing unit 22 stores, by this function, information such as the number that the states requiring caution occurred in the past, to what degree the obstacle approached the vehicle, on which side of the vehicle the alarm was generated, or the like, in the memory 2B as the traveling state data 26. The data 26 is referred to by the area setting unit 24 as described above, whereby the appropriate alarming area is automatically set corresponding to the past driving state of the driver.

OPERATIONAL EXAMPLE 1

Next, the operation of the present embodiment will be explained with reference to FIGS. 6 through 9.

Figure 6:
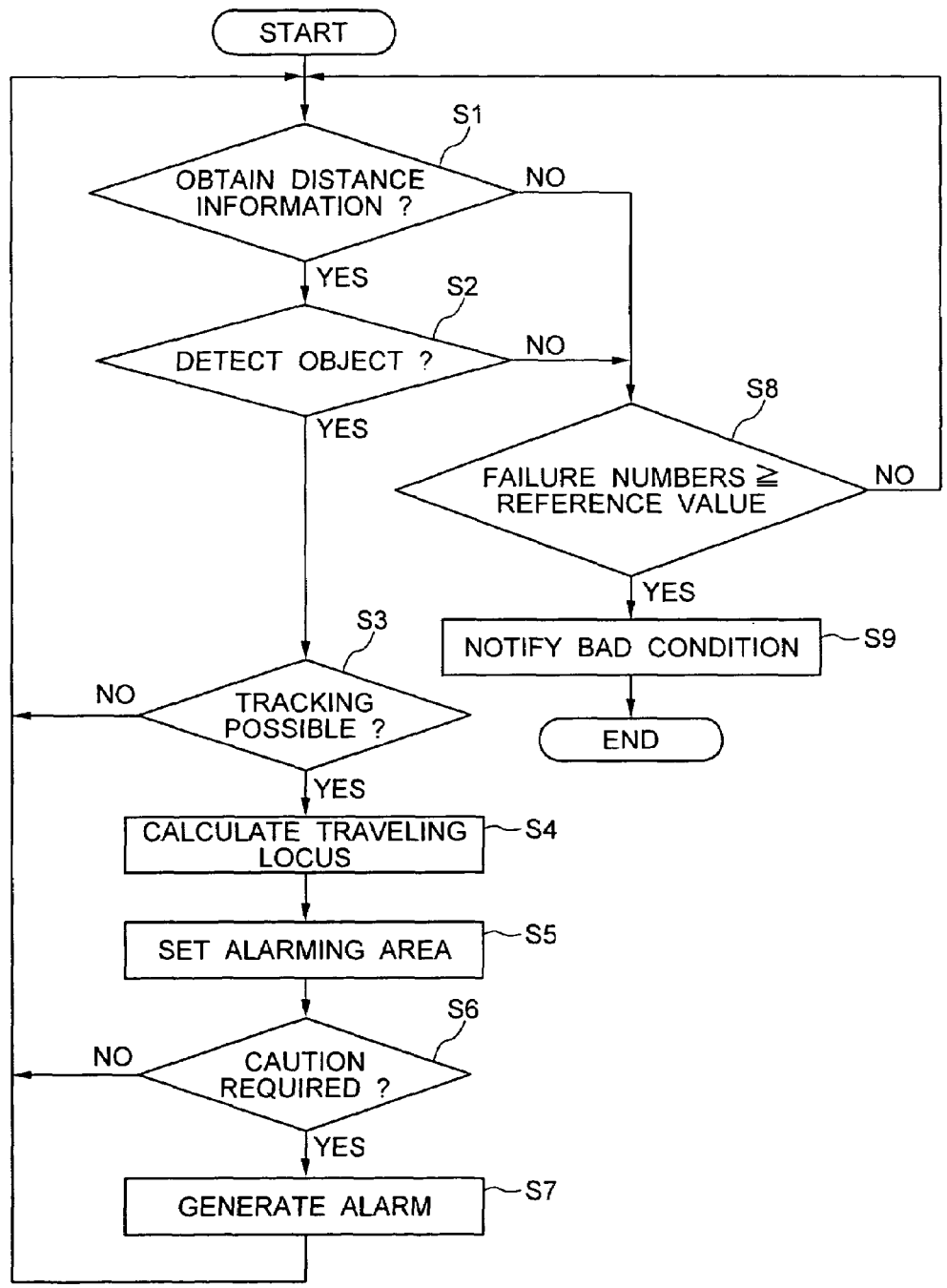
FIG. 6 is a flowchart showing the operation of an operational example 1 of the first embodiment.

First, the distance sensor 1 obtains distance information of the obstacle, that is, obstacle data, which is received by the obstacle data obtaining unit 21 (step S1 in FIG. 6). A specific example of this will be described with reference to FIGS. 7(1)(*a*) and 7(1)(*b*). As shown in FIG. 7(1)(*a*), the vehicle 10 in the operational explanation travels in a direction of the arrow A1 along the wall 51, and also intends to travel so as to turn the corner where the pole 52 exists (hereinafter, see the arrow A1 for the traveling direction of the vehicle 10). The preliminary alarming range BR, which is the range that the distance sensor 1 recognizes and performs data processing, is so set that the width from the side part of the vehicle in the outward direction is 2 m, and the length from the rearmost part of the vehicle in the forward direction is 10 m. The alarming area AR is so set that the width D is 0.2 m, and the length L1 is 5 m. This means the driver is experienced in driving, and the alarming area of the left side of the vehicle is set to be narrow so as to prevent excessive faulty alarms.

Then, as shown in FIG. 7(1)(*a*), the points on the wall 51 and the pole 52 are detected as obstacles, but only data related to the balloons shown in FIG. 7(1)(*b*) is subject to processing. This will be described later.

Here, if the obstacle data obtaining unit 21 determines that the obstacle data cannot be obtained correctly (negative determination in step S1 in FIG. 6), the number of the obtainment failures are counted, and whether the value is the predetermined value (reference value) or more is determined (step S8 in FIG. 6). This value may be set in the program or separately stored in the memory 25. If the number of failures is the reference value or more (positive determination in step S8 in FIG. 6), the fact that the sensor is in the bad condition is informed to the occupants of the vehicle (step S9 in FIG. 6). For example, an indication showing the condition is flashed on the instrument panel. In contrast, if the number of failures is less than the reference value (negative determination in step S8 in FIG. 6), distance information is again obtained. A counter value related to the obtainment failure of the distance information is added only when continuous failures occur, and once an obtainment of distance succeeds, it is initialized. Further, when there is no obstacle to be detected around the vehicle although the sensor normally operates, a signal showing the sensor normally operates is output from the distance sensor 1 to the obstacle data obtaining unit 21, and the aforementioned number of failures are not counted.

When the distance information is obtained normally (positive determination in step S1 in FIG. 6), processing of detecting the obstacle is performed (step S2 in FIG. 6). That is, processing of dividing the points on the detected obstacles into each same object (grouping) is carried out. In this embodiment, a group of balloons shown in FIG. 7(1)(*b*) are recognized as one object. Assuming they are within the preliminary alarming area BR, a group of black squares are recognized as another object. If it is possible to detect the object (positive determination in step S2 in FIG. 6), it is determined whether this obstacle can be tracked, that is, whether the positions of the obstacle before and after in time have been detected (step S3 in FIG. 3). In contrast, if it is impossible to detect the object (negative determination in step S2 in FIG. 6), such an obtainment failure is also counted separately (step S8 in FIG. 6). As same as aforementioned, if the number of failures reaches or exceeds the predetermined number, it is notified to the driver (step S9 in FIG. 6), and if the number of failure does not reach the predetermined number, returning to the processing of detecting the obstacle (step S1 in FIG. 6).

When it is determined whether the tracking is possible in the step S3, if in the initial state, tracking is determined to be impossible since there are only few pieces of information about the obstacle (negative determination is step S3 in FIG. 6), so that detecting processing of the obstacle is carried out again (step S1 in FIG. 6). Further, when obstacles are detected continuously in terms of time, the traveling speeds of the obstacles are calculated, and based on the traveling speeds, it is determined whether they are the same object. Then, if they are the same object, it is determined to be able to be tracked (positive determination in step S3 in FIG. 6), and if not, the detecting processing of the obstacle is carried out again (back to step S1 in FIG. 6). Here, the tracking processing is carried out in such a manner that the traveling speed is calculated by assuming the obstacles existing within a range around the detected obstacle as the same object, calculating the traveling speed thereof, and comparing the traveling speeds and the past traveling speed of the object.

Figure 9:
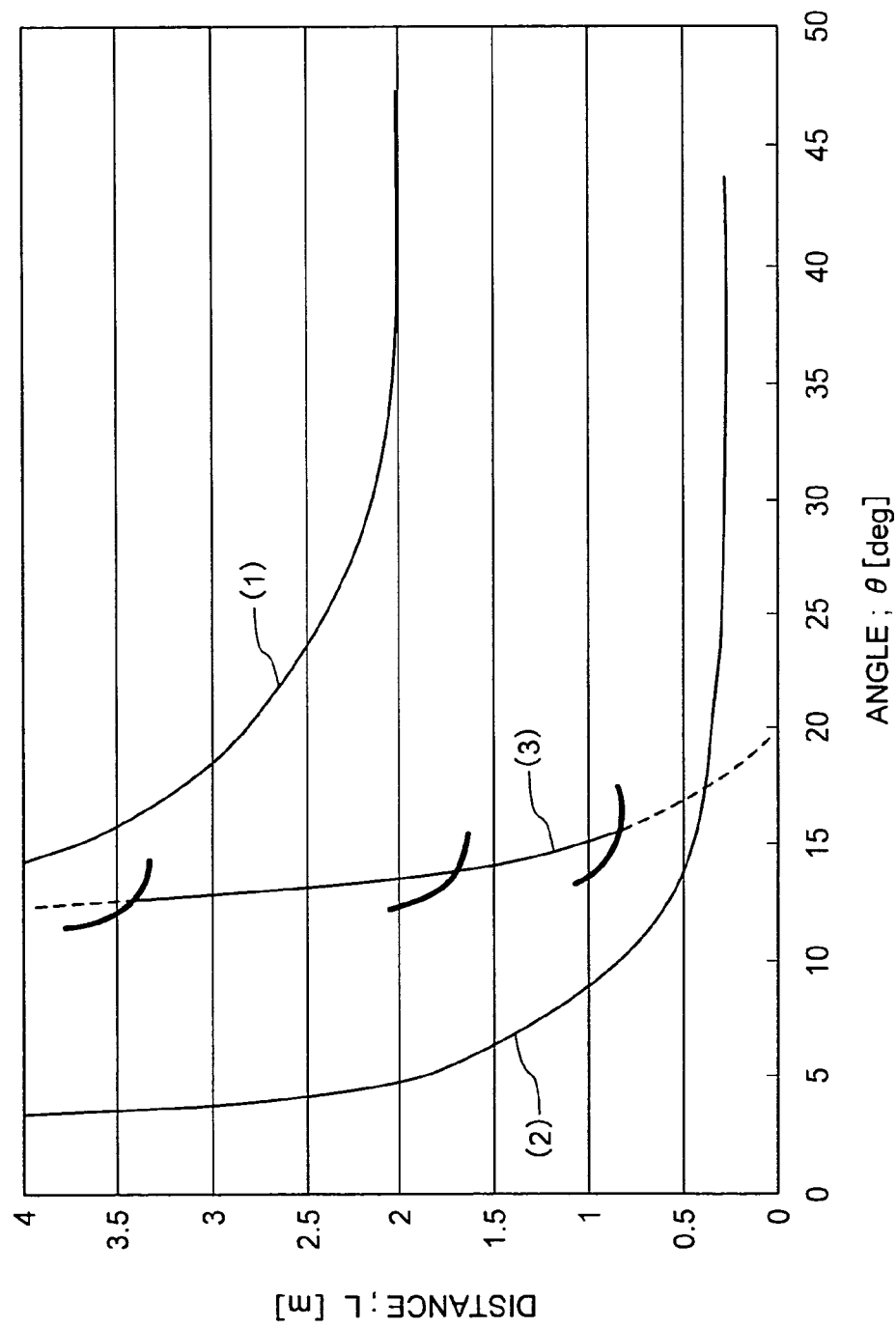
FIG. 9 is a chart showing the traveling locus of the obstacle disclosed in FIGS. 7(1)(*a*), 7(1)(*b*), 7(2)(*a*), 7(2)(*b*), 8(1)(*a*), 8(1)(*b*), 8(2) (*a*) and 8(2)(*b*)

For example, when the positions of the vehicle 10 moves from the one shown in FIG. 7(1)(*a*) to the one shown in FIG. 7(2)(*a*), the detected points on the pole 52 (a group of balloons in FIG. 7(2)(*b*)) are tracked (a step of tracking an obstacle). Then, when the vehicle 10 further moves from the position shown in FIG. 7(2)(*a*) to the position shown in FIG. 8(1)(*a*), and then to the position shown in FIG. 8(2)(*a*), the relative positions between the vehicle 10 and the pole 52 become those shown in FIG. 8(1)(*b*) and FIG. 8(2)(*b*). FIG. 9 is a graph showing the distances of the detected points on the pole 52. The curve (1) shows the preliminary alarming area and the curve (2) shows the alarming area set as described later.

Next, if tracking is possible, the traveling locus is calculated (step S4 in FIG. 6, a step of calculating a traveling locus). Here, the traveling locus is calculated by the least squares method or the like from the positions of the object which have been detected. Then, the traveling locus thereafter is also predicted from the calculated formula showing the locus. For example, the traveling locus of the examples shown in FIGS. 7(1)(*a*) through 8(2)(*b*) becomes the curve (3) in FIG. 9, and the dotted line shows the predicted traveling locus thereafter.

Next, the area setting unit 24 sets the alarming area AR (step S5 in FIG. 6, a step of setting an alarming area). Here, the alarming area, which has been set initially based on the reference data, may be set, as described above. Alternatively, an area of the range designated by the manipulation performed by the driver via the area setting unit 4 may be set. For example, in the examples shown in FIGS. 7(1)(*a*) through 8(2)(*b*), the area is set by a driver being experienced in driving, and the alarming area AR is set to be narrow having the width D of 2 m and the length L of 5 m (half-tone dot meshed area). In FIG. 9, the curve (2) corresponds to this alarming area. However, the area setting is confirmed in the step S5, and processing proceeds with the state which has already been set, unless an instruction to change the setting is output.

Next, based on the traveling locus calculated in the step S4 and the alarming area set in the step S5, it is determined whether caution is required to the obstacle (step S6 in FIG. 6, a step of determining the traveling locus). More specifically, the traveling locus is checked whether it enters into the alarming area. For example, in the example shown in FIG. 9, the predicted part (dotted line) of the calculated traveling locus thereafter is expected to across the curve (2) showing the alarming area. Thereby, this is detected and it is determined that caution is required (positive determination is step S6 in FIG. 6). In contrast, if the traveling locus is determined not to enter into the alarming area, returning to the step S1 and the processing of detecting the obstacle is repeated.

If it is determined that caution is required, an alarm output instruction is issued to the alarm control unit 23 (step S7 in FIG. 6, a step of generating an alarm), and the alarm control unit 23 operates the alarming device 3. Thereby, an alarm with a sound, for example, is generated in the vehicle, so that the driver recognizes the alarm and can take caution against the surroundings.

With these steps, the relative position of the vehicle 10 and the obstacle is measured and also the traveling locus thereafter is predicted. Thereby, it is possible to determine with high accuracy whether the obstacle may contact the vehicle, even when the obstacle is moving. This can provide a more effective alarm to thereby urge the occupants to take caution.

Further, it is possible to determine whether caution is required against the obstacle without any necessity to detect driving information such as a steering angle of the vehicle. Therefore, the volume of information detected is small and quick processing is also possible.

OPERATIONAL EXAMPLE 2

Figure 12:
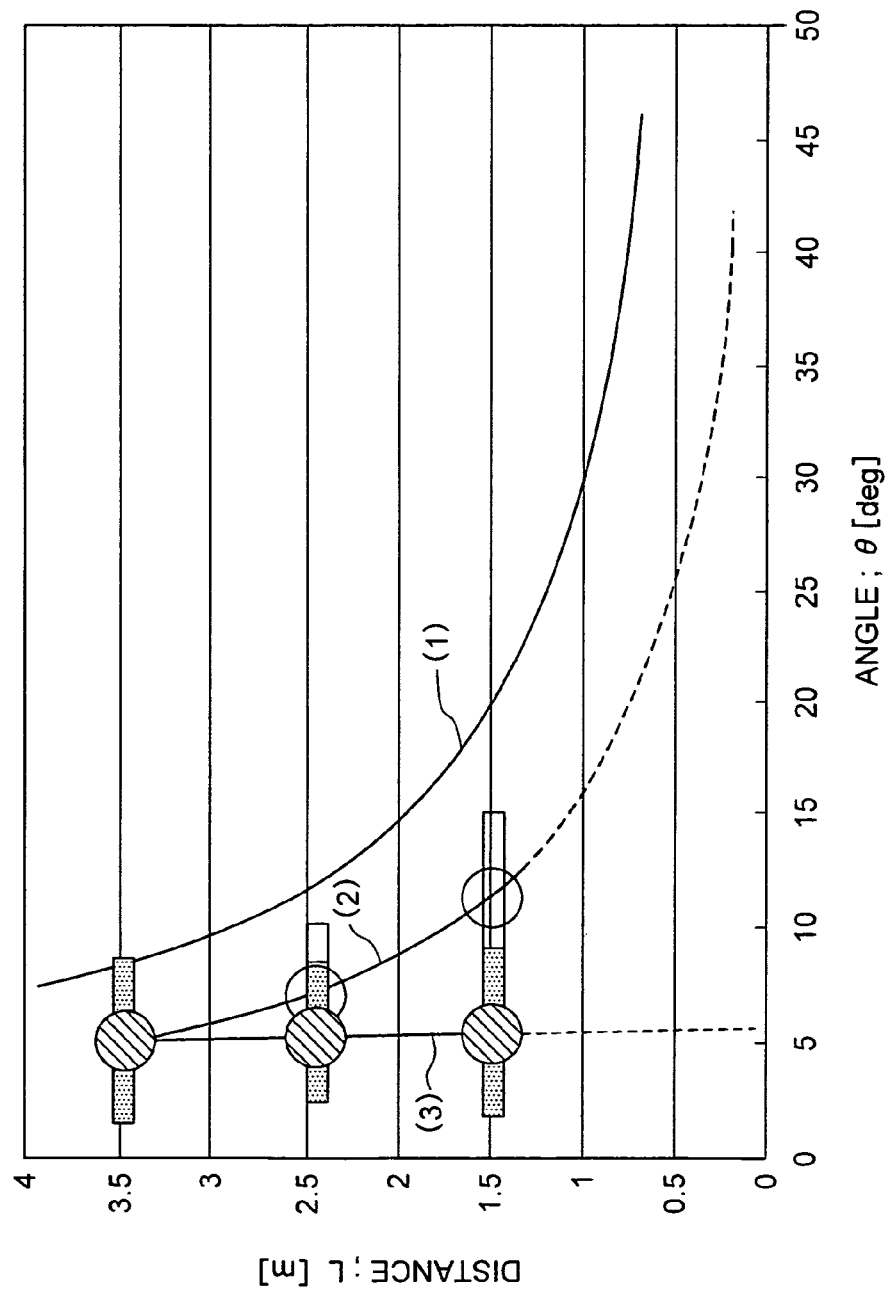
FIG. 12 is a chart showing the traveling locus of the obstacle disclosed in FIGS. 11(1), 11(2)(*a*) and 11(2)(*b*)

Next, another operational example with the aforementioned structure will be described with reference to FIGS. 10 through 12.

In the present operational example, the alarming area AR (half-tone dot meshed area) is set on the right side of the vehicle 10 as shown in FIG. 11. The present operational example is so configured that an alarm is generated when caution is required mainly against an oncoming vehicle 100. In the present embodiment, the width of the alarming area AR is set to 0.5 m, and is so configured that an alarm is generated when the obstacle is determined to enter into the alarming area AR, and then the alarm stops when the obstacle is determined not to contact the vehicle.

First, as shown in FIG. 11(1), the self vehicle 10 is traveling in a direction of the arrow A1, and the oncoming vehicle 100 is traveling in a direction of the arrow A2 on the opposite lane so as to pass by each other. Here, since a part of the oncoming vehicle 100 has already entered into the alarming area AR, not only the tracking process has started but also an alarm is generated. Then, the detected part is tracked. Then, a certain time later, they become to have a positioning relation shown in FIG. 11(2)(*a*) or FIG. 11(2)(*b*), and the traveling locus is calculated after tracking processing. When tracking of a certain degree has carried out and it is determined that the traveling locus has a high reliability, for example, when the tracking is carried out for five consecutive times, it is determined whether the traveling locus of the obstacle may contact the vehicle 10. Note that in FIG. 11(2)(*a*), the vehicle 10 is traveling so as to pass by the oncoming vehicle 100 while keeping a certain distance, and in FIG. 11(2)(*b*), the vehicle 10 is traveling so that the distance to the oncoming vehicle 100 becomes narrow.

Figure 10:
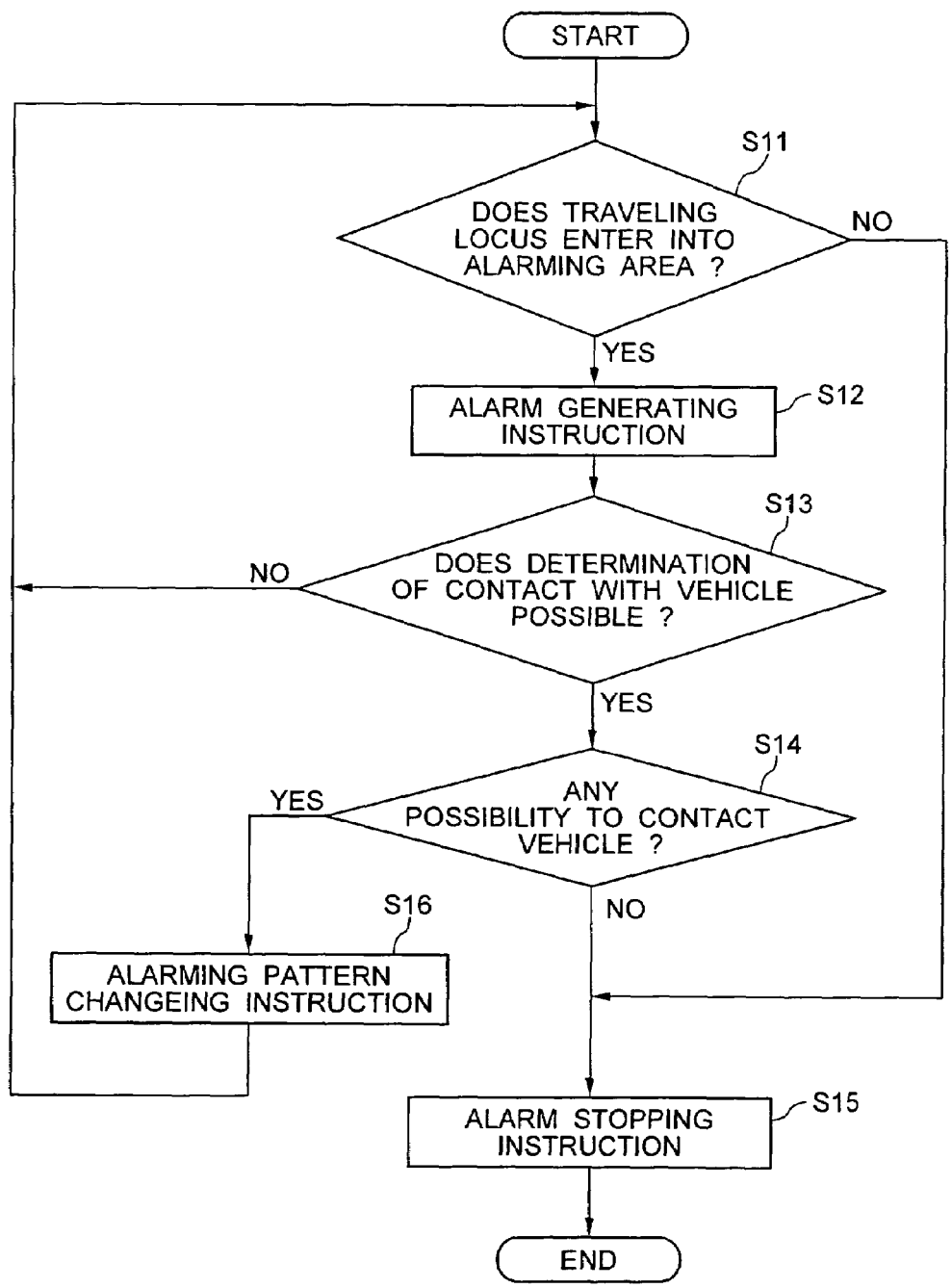
FIG. 10 is a flowchart showing the operation of an operational example 2 of the first embodiment.

FIG. 10 is a flowchart showing the detail of the processing to determine whether an alarm is generated after tracking, following the calculation of the traveling locus, in the case of FIGS. 11(1), 11(2)(*a*) and 11(2)(*b*). Such processing is the aforementioned steps S6 and S7 in FIG. 6, in the present operational example.

As shown in FIG. 10, following the calculation of the traveling locus, it is checked whether the extended line of the traveling locus enters into the alarming area (step S11 in FIG. 10), and if determined to enter (positive determination in step S11 in FIG. 10), an instruction that an alarm should be generated is output to the alarm control unit 12 (step S12 in FIG. 10). In contrast, if it is determined not to enter, an alarm stopping instruction is output (step S15 in FIG. 10), and if an alarm has already output, the output of the alarm stops.

The obstacle tracking process continues during the alarm being generated. If the tracking process is continued up to the point where the contact possibility with the vehicle can be determine from the traveling locus (positive determination in step S13 in FIG. 10), the contact possibility is checked (step 14 in FIG. 10). Here, if it is determined that there is no contact possibility (negative determination in step S14 in FIG. 10), the alarm being output stops (step S15 in FIG. 10). For example, in the case of the oncoming vehicle 100 passing by the self vehicle 10 while keeping a certain distance as shown in FIG. 11(1) to FIG. 11(2)(*a*), the traveling locus becomes the curve (2) shown in FIG. 12. In such a case, the traveling locus becomes one almost parallel with the curve (1) indicating the alarming area, whereby there is no possibility to contact the vehicle, so that the alarm stops.

On the other hand, if it is determined to have a contact possibility with the vehicle (positive determination in step S14 in FIG. 10), an instruction to change the alarming pattern is output, whereby an alarm of different pattern is generated. For example, this is a case that the oncoming vehicle 100 approaches the self vehicle 10 as shown in FIG. 11(1) to FIG. 11(2)(*b*). In such a case, the traveling locus becomes the curve (3) shown in FIG. 12. From the extended line thereof, it is determined that the traveling locus may contact the vehicle and more caution is required, thereby another alarming sound is output.

OPERATIONAL EXAMPLE 3

Next, an operational example 3 will be explained with reference to FIG. 13.

First, an example shown in FIG. 13(a) is a case in which an obstacle such as a two-wheel barrow passes through the left side of the vehicle 10 from behind while keeping a certain distance. In such a situation, the two-wheel barrow 100 is detected as an obstacle by the distance sensor 1 when approaching the side part of the vehicle from the behind, and it enters into the alarming area AR. In this stage, an alarm is generated. Then, the travel of the two-wheel barrow 100 is further tracked, and the traveling locus with high reliability is predicted, whereby it is determined whether the two-wheel barrow 100 may contact the vehicle 10. If there is no possibility to contact, the output of the alarm stops. Here, if the traveling locus determining function provided to the obstacle data processing unit 22 of the CPA 2A does not determine whether the traveling locus enters into the alarming area AR but only determines whether the traveling locus contacts the vehicle, an alarm will not generated at all. Therefore, it is possible to prevent such an annoyance that an alarm keep going off in the vehicle.

FIG. 13(b) shows an example in which a two-wheel barrow 100 is traveling on the left side of the vehicle from the behind, and the vehicle 10 is going to turn left, which may catch the two-wheel barrow 100. In such a situation, when the vehicle 10 changes the traveling direction into the arrow A2 direction so as to turn left, the relative traveling locus of the two-wheel barrow detected may enter into the alarming area AR or contact the vehicle 10. Therefore, an alarm is generated when such a determination is done, so that the driver can effectively take caution against an obstacle such as the two-wheel barrow coming from the behind.

(Second Embodiment)

Next, a second embodiment of the present invention will be explained with reference to FIG. 14.

Figure 14:
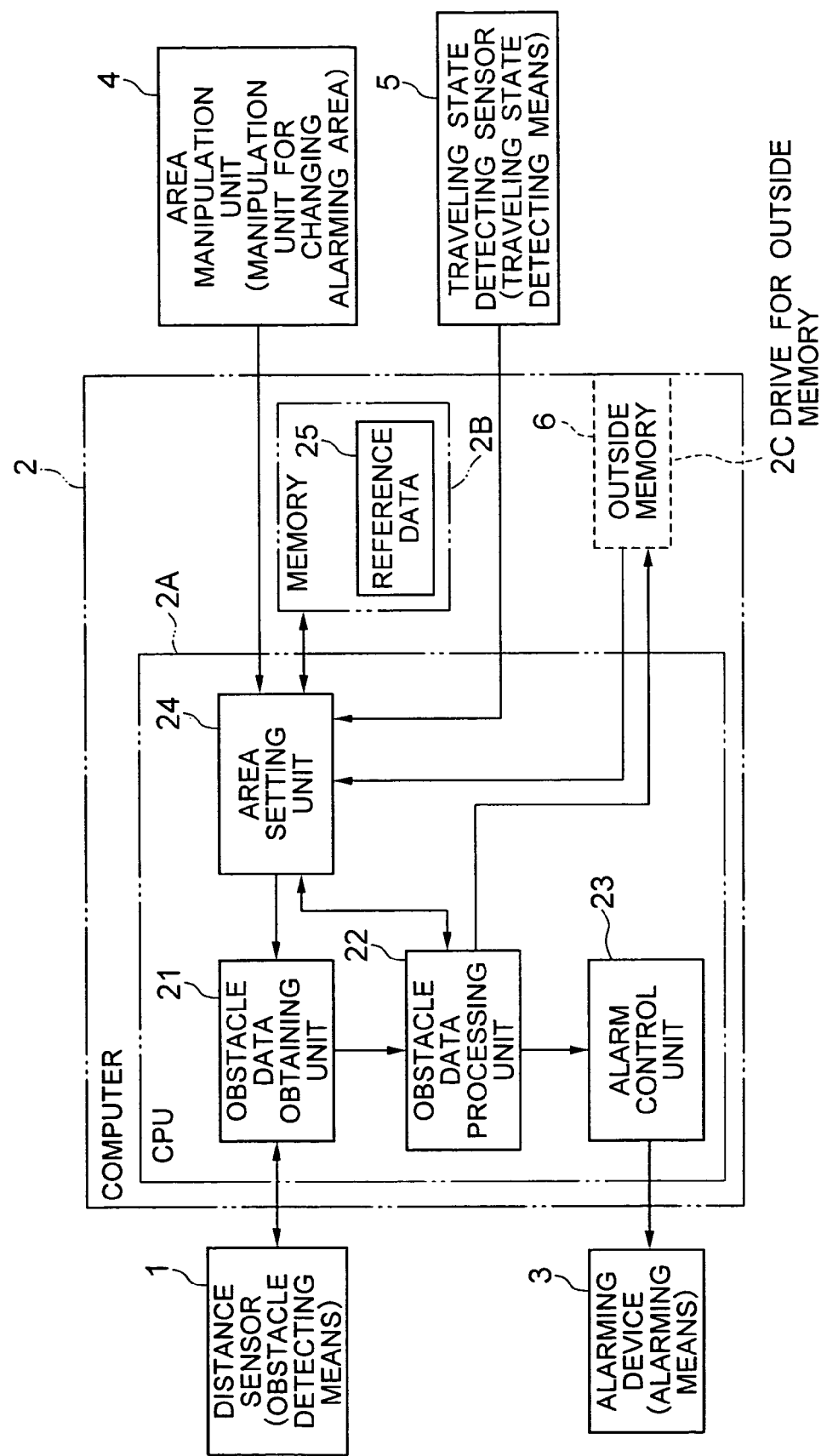
FIG. 14 is a functional block diagram showing the structure of a second embodiment according to the present invention.

As shown in FIG. 14, the present system includes a traveling state detecting sensor 5 as a traveling state detecting means for detecting data related to the traveling state of the vehicle 10, in addition to the structure of the aforementioned first embodiment. The traveling state detecting sensor 5 may be, for example, a speed sensor, a steering angle sensor, a slot position sensor, a brake sensor, a shift position sensor, am acceleration sensor. Data detected by any one of these sensors is output to the area setting unit 24 and is used for setting the alarming area AR.

Along with this configuration, the alarming area setting function of the area setting unit 24 additionally has a function of setting the alarming area AR based on the traveling state data of the vehicle. Further, the reference data 25 in the memory 2B includes corresponding values related to the traveling state of the vehicle 10 and the width D and the length L of the alarming area AR. Here, if the traveling speed is detected as the traveling state, a value for expanding the alarming area is set in a case of the high speed, and a value for narrowing the alarming area is set in a case of the low speed.

More specifically, if the traveling state detecting sensor 5 is a speed sensor, the current traveling speed of the vehicle 10 is output to the area setting unit 24. Then, the area setting unit 24 reads out from the reference data 25 the values of the width D and the length L of an alarming area AR appropriate for the received speed of the vehicle 10, and according to the read value, sets the alarming area AR. Then, based on the alarming area AR set, it is determined whether caution is required for the detected obstacle.

Even in a case that the traveling state detecting sensor 5 is one other than a speed sensor, for example, in a case of it being a sensor for detecting the steering angle, the alarming area is set so as to be wider in a direction where the vehicle is going to turn, corresponding to the steering angle. Further, in a case of it being an acceleration sensor, the alarming area is set so as to be wider corresponding to the detected acceleration.

Thereby, the traveling speed or the steering angle of the vehicle, which is data related to the traveling state, is detected, and based on the data, the alarming area is set. Therefore, it is possible to generate a more effective alarm corresponding to the current traveling state of the vehicle.

The aforementioned area manipulation unit 4 which can be manipulated by the driver includes a manipulation unit by which the driver can designate the setting of the alarming area with reference to the traveling state. Therefore, the driver can, through manipulating the manipulation unit, select the setting such as setting the alarming area appropriately corresponding to the speed. Note that if the manipulation unit is not manipulated, the alarming area is set based on the initial setting of the reference data, as same as the aforementioned first embodiment.

Further, in the present embodiment, there is provided a drive 2C for outside memory which enables an outside memory 6 to be inserted into the computer 2. The outside memory 6 may be, for example, an easily portable medium such as a smart media or a Compact Flash (registered trademark). Such a drive 2C for outside memory is connected to the obstacle data processing unit 22 and the area setting unit 24, which enables data exchanges with the outside memory 6.

With this configuration, the obstacle data processing unit 22 operates, by the function of recording alarm generation state data thereof, to record in the outside memory 6 data related to the alarm generating state during traveling of the vehicle. That is, by inserting a different outside memory 6 for each driver into the drive 2C, traveling state data for each driver is stored in the outside memory 6.

The traveling state data for each driver stored in the outside memory 6 is read out by the area setting unit 24. Then, the area setting unit 24 sets, by the alarming area setting function thereof, the alarming area based on data related to the alarm generated state during the past traveling of the vehicle stored in the outside memory 6.

As such, by inserting the outside memory 6 into the drive 2C provided to the prescribed part of the vehicle 10, an alarming area appropriate for the driver of that time is automatically set. Therefore, an alarm appropriate for the driver will be easily generated without any particular manipulation.

Here, the area setting unit 4 detects whether the outside memory 6 is inserted into the drive 2C for outside memory, and if inserted, reads out data from the memory 6 and operates so as to set the alarming area. Similarly, when the outside memory 6 is inserted, the obstacle data processing unit 22 writes traveling state data into the memory 6. However, these instructions may be carried out by the driver via the area setting unit 4. Further, if the outside memory 6 is not inserted, the alarming area is set based on the initial setting of the reference data, as same as the aforementioned first embodiment.

The driving state data stored in the outside memory 6 is in a form which is readable in other computers and can be displayed on such other computers. Thereby, it is possible to analyze the data later and to recognize the driving state of oneself. Further, it is also possible to be advised by a professional. Therefore, the driving technique can be improved.

(Third Embodiment)

Next, a third embodiment of the present invention will be explained with reference to FIGS. 15 and 16.

An obstacle in the present invention is a wall 200, and the present invention is configured to recognize the obstacle as a "wall". The basic structure is same as those of the aforementioned embodiments, except that the obstacle data processing unit 22 of the computer 2 has the following function.

The obstacle data processing unit 22 of the present invention has a detection range limiting function. This function limits a range of detecting the obstacle by the distance sensor 1 to a predetermined range on the side of the vehicle and in front thereof, if the length of the obstacle 200, in a back and forth direction of the vehicle, detected at almost the same time is longer than the predetermined length. Further, the obstacle data processing unit 22 is so configured as to track, by the aforementioned obstacle tracing function, the middle point of the length of the obstacle when the obstacle detection range is limited by the detection range limiting function.

The obstacle data processing unit 22 first determines whether the points on the obstacle detected by the grouping are of the same object. Then, the obstacle data processing unit 22 checks the form of the obstacles seemed to be the same object. If it is an approximately linear object extending in a back and forth direction of the vehicle 10, the obstacle data processing unit 22 checks the length. If the length is the predetermined length (for example, 5 m) or more, stored in the memory 2B or the like, the obstacle data processing unit 22 determines the obstacle as the wall 200. Then, the obstacle data processing unit 22 limits the detection range of the obstacle to a range of almost 1 m ahead of the vehicle. Here, a signal, indicating the obstacle being recognized as a wall, is referred to when the obstacle tracking function and the alarming area setting function of the area setting unit 24 are carried out.

Then, if the obstacle data processing unit 22 receives a signal indicating the obstacle being a wall, tracks, by the obstacle tracking function thereof, the middle point between the detecting point around the rear part of the vehicle and the detecting part in the detection range limited at the front of the vehicle. Therefore, the obstacle data processing unit 22 only calculates the traveling locus of the middle point.

Further, if the obstacle data processing unit 22 receives a signal indicating the obstacle being a wall, sets, by the alarming area setting function thereof, the alarming area to have a distance shorter than the distance from the side part of the vehicle 10 to the obstacle. More specifically, the distance to the side part of the vehicle, which is the width D of the alarming area, is set to be shorter than the current distance D2 (D2=L*sin θ) to the wall 200. For example, if the current distance D2 to the wall is 3 m, the width D of the alarming area is set to 50 cm.

Figure 16:
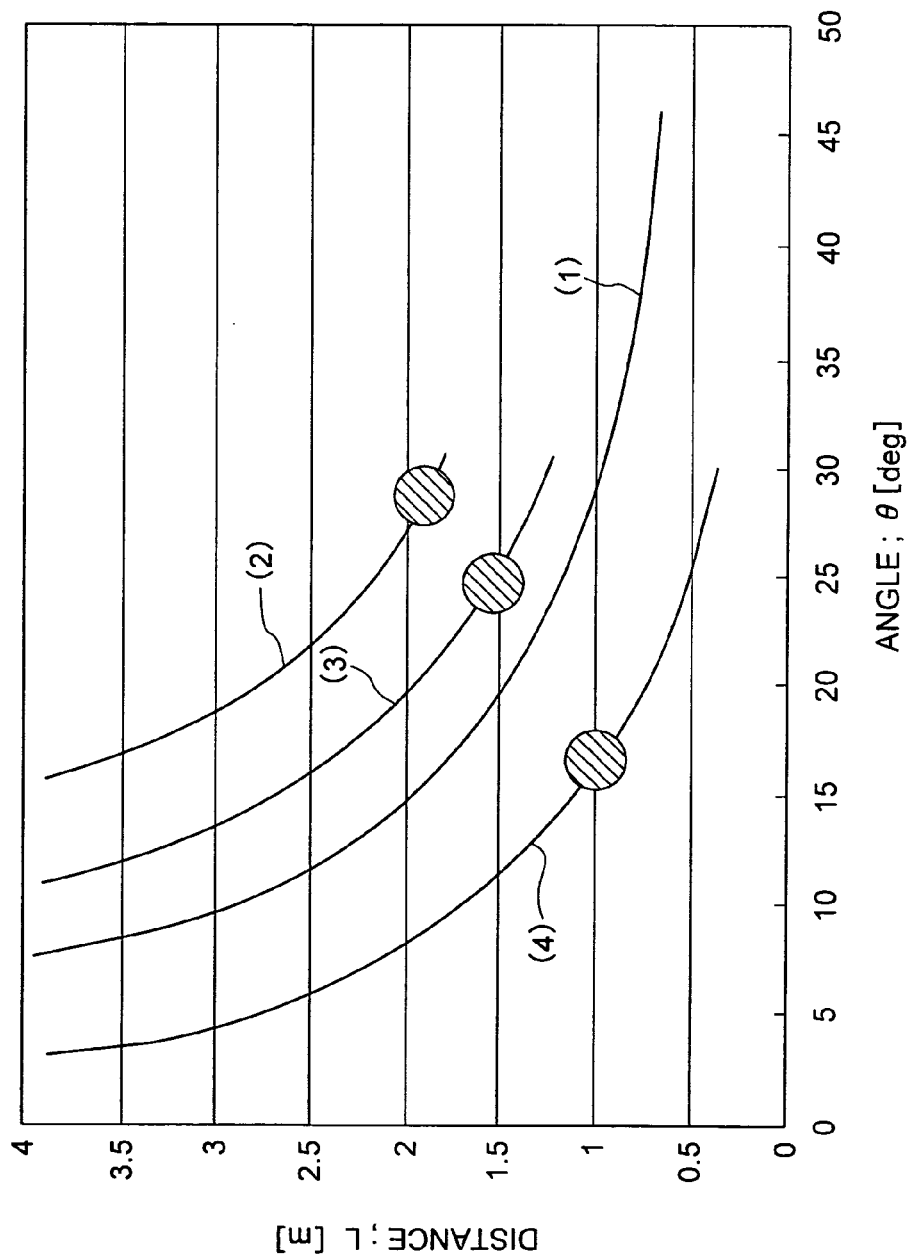
FIG. 16 is a chart showing the traveling locus of the obstacle disclosed in FIG. 15.

Here, a specific example of the operation of the system if a wall exists as an obstacle will be explain with reference to FIGS. 15(a) through 16. First, as shown in FIG. 15(a), assuming that the vehicle 10 is traveling in the arrow A1 direction along the wall 200 while keeping a distance of 3 m from the wall 200. Here, points on the wall 200 are detected as obstacles. Since these points linearly continue, they are determined as the same object. If the length thereof is determined to be 5 m or more along the back and forth direction of the vehicle, the obstacle is recognized as the wall 200. Then, the detecting area of the obstacle is limited up to almost 1 m (L3) ahead of the vehicle 10, and the approximate middle point (shown as the arrow P in FIG. 15(a)) between the detection point at the rear of the vehicle and the detection point in front is tracked. Further, an alarming area AR is set to a range in which the width D to the side part of the vehicle 10 is 50 cm (not shown in FIG. 15). A curve showing this alarming area is shown as the curve (1) in FIG. 16. The length of the obstacle can be determined by calculating L*cos θ. Similarly, the limit of the detection range of the obstacle can be identified by considering the length of the vehicle 10 itself, L*cos θ, the position where the distance sensor is mounted, and the like.

Cases that the traveling positions of the vehicle 10 with reference to the wall 200 become those shown in FIGS. 15(b), 15(c), and 15(d), after the alarming area has been set as described above, will be explained. First, when the vehicle 10 is traveling along the wall 200 in such a positioning relation as shown in FIG. 15(b), the traveling locus of the wall relative to the vehicle becomes a curve (2) shown in FIG. 16. That is, the distance between the vehicle 10 and the wall 200 is almost 1.5 m, and the traveling locus is not expected to enter into the alarming area, whereby no alarm is generated.

Further, when the vehicle 10 is traveling along the wall 200 in such a positioning relation as shown in FIG. 15(c), the traveling locus of the wall relative to the vehicle becomes a curve (3) shown in FIG. 16. That is, the distance between the vehicle 10 and the wall 200 is almost 1 m, and the traveling locus is not expected to enter into the alarming area, whereby no alarm is generated. As such, although the wall 200 enters into the alarming area AR and an alarm should be generated generally, the driver recognizes to drive along the wall in this case. In such a case, an unnecessary alarm is prevented.

If the vehicle 10 is traveling along the wall 200 in such a positioning relation as shown in FIG. 15(d), the traveling locus of the wall relative to the vehicle becomes a curve (4) shown in FIG. 16. That is, the distance between the vehicle 10 and the wall 200 is about 0.5 m, and the traveling locus has already entered into the alarming area, whereby an alarm is generated. Note that by the time the state shifted to such a state, a point where the traveling locus crosses the curve (1) indicating the alarming area arises, and the alarm is generated in the stage where the crossing is predicted.

As described in the first embodiment, with the structure in which an alarm stops if an obstacle is determined not to contact the vehicle or an alarm is not generated in the first place, there arises a situation where an alarm, which has been generated, stops, or an alarm is output in a stage where the traveling locus is determined to contact the vehicle.

(Effects)

The present invention is so configured as to track the position of an obstacle, calculate the traveling locus of the obstacle relative to the vehicle and the expected traveling locus thereafter, and determines from the traveling locus whether the obstacle will enter into the alarming area of the vehicle, to thereby generate an alarm. Therefore, even in a case of an obstacle being moving, the traveling locus thereof relative to the vehicle is calculated, whereby a possibility whether the obstacle will contact the vehicle can be determined with high accuracy. This can provide a more effective alarm to urge the occupants to take caution.

Further, there is no need to detect the traveling state of the vehicle when determining whether caution against an obstacle is required or not. Therefore, it is not required to detect a signal output from other sensors such as a steering angle sensor and a speed sensor, and an effective alarm against an obstacle can be generated with an easier structure.

What is claimed is:

1. An alarming system for vehicle comprising:
    obstacle detecting means for detecting obstacle data which is data related to a position of an obstacle existing on a side of a vehicle and in front thereof;
    a computer for computing the obstacle data output from the obstacle detecting means; and
    alarming means for alarming occupants of the vehicle based on an instruction from the computer;
    which are mounted in the vehicle, wherein
    the computer includes:
    an alarming area setting function which sets, as an alarming area, a range having a certain distance from a side part of the vehicle and an extended line of the side part in a forward direction of the vehicle, in an outward direction lateral to the side part of the vehicle;
    an obstacle tracking function which tracks the obstacle based on the obstacle data detected by the obstacle detecting means;
    a traveling locus calculating function which calculates a traveling locus, relative to the vehicle, of the obstacle tracked by the obstacle tracking function, and predicts the traveling locus of the obstacle;
    a traveling locus determining function which determines whether the traveling locus of the obstacle predicted by the traveling locus calculating function enters into the alarming area; and
    an alarm generating function which gives an alarm to the occupants by the alarming means when the traveling locus determining function determines that the traveling locus of the obstacle enters into the alarming area.

2. The alarming system for vehicle, as claimed in claim 1, wherein the obstacle detecting means is mounted on a predetermined part at a rear of the side part of the vehicle, and detects data related to a position of an obstacle existing on the side of the vehicle and in front thereof.

3. The alarming system for vehicle, as claimed in claim 1, wherein the computer further includes a preliminary area setting function which sets a preliminary alarming area having a range larger than that of the alarming area, and
    the computer detects, by the obstacle tracking function thereof, an obstacle existing within the preliminary alarming area and tracks the obstacle.

4. The alarming system for vehicle, as claimed in claim 1, further comprising, traveling state detecting means for detecting data related to a traveling state of the vehicle, which means is mounted in the vehicle, wherein
    the computer sets, by the alarming area setting function thereof, the alarming area based on traveling state data of the vehicle which unit is output from the traveling state detecting means.

5. The alarming system for vehicle, as claimed in claim 1, further comprising a manipulation unit for changing the alarming area, which is mounted in the vehicle and is manipulated by an occupant of the vehicle so as to change the alarming area, wherein
    the computer sets, by the alarming area setting function thereof, the alarming area according to a manipulated state of the manipulation unit for changing the alarming area.

6. The alarming system for vehicle, as claimed in claim 1, wherein the computer further includes a function of recording obstacle detecting state data, which function records data related to a detected state of the obstacle during traveling of the vehicle, and
    the computer sets, by the alarming area setting function thereof, the alarming area based on the obstacle detecting state data which is stored by the function of recording the obstacle detecting state data.

7. The alarming system for vehicle, as claimed in claim 1, wherein the computer determines, by the traveling locus determining function thereof, whether the traveling locus of the obstacle contacts the vehicle, and
    if the traveling locus of the obstacle is determined by the traveling locus determining function not to contact the vehicle, the computer stops, by the alarm generating function, the alarm which has been generated by the alarming means.

8. The alarming system for vehicle, as claimed in claim 1, wherein the computer further includes a detecting range limiting function which, if a length of the obstacle in a back and forth direction of the vehicle detected at almost a same time has a predetermined length or more, limits a detecting range of the obstacle by the obstacle detecting means to a predetermined range provided on the side of the vehicle and in front thereof, and
    the computer tracks, by the obstacle tracking function, a middle point of the length of the obstacle when the detecting range of the obstacle is limited by the detecting range limiting function.

9. The alarming system for vehicle, as claimed in claim 8, wherein if the detecting range of the obstacle is limited by the detecting range limiting function, the computer sets, by the alarming area setting function thereof, the alarming area to have a distance shorter than a distance from the side part of the vehicle to the obstacle.

10. The alarming system for vehicle, as claimed in claim 1, wherein the computer calculates, by the obstacle tracking function thereof, a traveling speed of each obstacle from the obstacle data of each obstacle detected before and after in time within a certain range, and through comparing respective traveling speeds, tracks those having the traveling speeds which fall within a predetermined acceptable range as a same obstacle.

11. An alarm generating method for vehicle, comprising the steps of:
    tracking an obstacle, in which an obstacle existing on a side of a vehicle or in front thereof is tracked based on obstacle data detected by an obstacle detecting means mounted in a vehicle;
    calculating a traveling locus, in which a traveling locus, relative to the vehicle, of the obstacle tracked in the step of tracking the obstacle is calculated, and also the traveling locus thereafter is predicted;
    setting an alarming area, following the step of calculating the traveling locus at a latest, in which a range having a certain distance from a side part of the vehicle and an extended line of the side part in a forward direction of the vehicle, in an outward direction lateral to the side part of the vehicle, is set as an alarming area;
    determining the traveling locus, in which the traveling locus of the obstacle is determined whether it enters into the alarming area; and
    generating an alarm, in which an alarm is given to occupants of the vehicle by an alarming means when the traveling locus is determined to enter into the alarming area.

12. An alarming system for vehicle comprising:
obstacle detecting means for detecting obstacle data which is data related to a position of an obstacle existing on a side of a vehicle or in front thereof;
a computer for computing the obstacle data detected; and
alarming means for alarming occupants of the vehicle;
which are mounted in the vehicle, wherein
the computer includes:
an obstacle tracking function which tracks the obstacle based on the obstacle data detected by the obstacle detecting means;
a traveling locus calculating function which calculates a traveling locus, relative to the vehicle, of the obstacle tracked by the obstacle tracking function, and predicts the traveling locus thereafter;
a traveling locus determining function which determines whether the traveling locus of the obstacle predicted by the traveling locus calculating function contacts the vehicle; and
an alarm generating function which gives an alarm to the occupants of the vehicle by the alarming means when the traveling locus is determined by the traveling locus determining function to contact the vehicle.

13. An alarm generating method for vehicle comprising the steps of:
tracking an obstacle, in which an obstacle is tracked based on obstacle data detected by an obstacle detecting means;
calculating a traveling locus, in which a traveling locus, relative to the vehicle, of the obstacle tracked in the step of tracking the obstacle is calculated, and the traveling locus thereafter is predicted;
determining the traveling locus, in which the traveling locus of the obstacle predicted in the step of calculating the traveling locus is determined whether it contacts the vehicle; and
generating an alarm, in which an alarm is given to occupants of the vehicle by the alarming means when the traveling locus is determined in the step of determining the traveling locus to contact the vehicle.

* * * * *